US 8,489,761 B2

(12) United States Patent
Pope et al.

(10) Patent No.: US 8,489,761 B2
(45) Date of Patent: Jul. 16, 2013

(54) ONLOAD NETWORK PROTOCOL STACKS

(75) Inventors: Steven L. Pope, Cambridge (GB); David J. Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 950 days.

(21) Appl. No.: 12/373,173

(22) PCT Filed: Jul. 9, 2007

(86) PCT No.: PCT/IB2007/003444
§ 371 (c)(1),
(2), (4) Date: Jun. 12, 2009

(87) PCT Pub. No.: WO2008/038139
PCT Pub. Date: Apr. 3, 2008

(65) Prior Publication Data
US 2010/0057932 A1    Mar. 4, 2010

(30) Foreign Application Priority Data

Jul. 10, 2006  (GB) .................................. 0613684.0
Jul. 10, 2006  (GB) .................................. 0613687.3
Jul. 13, 2006  (GB) .................................. 0613976.0

(51) Int. Cl.
*G06F 15/16*      (2006.01)
(52) U.S. Cl.
USPC .......................................................... 709/236
(58) Field of Classification Search
USPC .......................................................... 709/236
See application file for complete search history.

(56) References Cited

U.S. PATENT DOCUMENTS 5,272,599 A    12/1993   Koenen
5,325,532 A     6/1994   Crosswy et al.
(Continued)

FOREIGN PATENT DOCUMENTS

EP          620521 A2     10/1994
WO       00-41358 A2      7/2000
(Continued)

OTHER PUBLICATIONS

Pradhan P et al., "Daytona: A User-Level TCP Stack," online report, 2002, retrieved from the Internet: URL:http://nms.csail.mit.edu/~kandula/data/daytona.pds [retrieved Jun. 20, 2008], 8 pp.

(Continued)

*Primary Examiner* — John MacIlwinen
(74) *Attorney, Agent, or Firm* — Haynes Beffel & Wolfeld LLP; Warren S. Wolfeld

(57) ABSTRACT

A method for transmitting data by means of a data processing system, the system supporting an operating system and at least one application and having access to a memory and a network interface device capable of supporting a communication link over a network with another network interface device, the method comprising the steps of: forming by means of the application data to be transmitted; requesting by means of the application a user-mode operating system functionality of the data processing system to direct the data to be transmitted, the request including an indication of a protocol by which the data is to be transmitted; responsive to that request, the user-mode operating system functionality selecting a protocol processing entity in accordance with the indication of a protocol by which the data is to be transmitted; forming within the context of the application by means of the protocol processing entity the data into packets for transmission in accordance with the protocol by which the data is to be transmitted and writing by means of the protocol processing entity the packets to be transmitted to an area of the memory; initiating by means of communication between the protocol processing entity and the network interface device a transmission operation of at least some of the packets over the network.

19 Claims, 9 Drawing Sheets

U.S. PATENT DOCUMENTS

| | | |
|---|---|---|
| 5,946,189 A | 8/1999 | Koenen et al. |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,424,710 B1 * | 9/2008 | Nelson et al. .................... 718/1 |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,742,473 B2 * | 6/2010 | Adams et al. ................ 370/389 |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0021680 A1 | 1/2005 | Ekis et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0223134 A1 * | 10/2005 | Vasudevan et al. ............. 710/22 |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| WO | 0148972 A1 | 7/2001 |
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |

| | | | |
|---|---|---|---|
| WO | 2011043769 A1 | 4/2011 | |
| WO | 2011053305 A1 | 5/2011 | |
| WO | 2011053330 A1 | 5/2011 | |

OTHER PUBLICATIONS

International Search Report issued Sep. 19, 2008 for PCT/IB2007/003444.
Jun. 4, 2012 examination report for EP 07 858 875, 2pp.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.

Gene Tsudik; ACM Computer Communication Review, vol. 22, No. 5, pp. 29-38, Oct. 1992.
C. Traw and J. Smith; IEEE Journal on Selected Areas in Communications, pp. 240-253, Feb. 1993.
Jonathan M. Smith and C. Brendan S. Traw; IEEE Network, vol. 7, Issue 4, pp. 44-52, Jul. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Stuart Wray, et al.; Proceedings of the International Conference on Multimedia Computing and Systems, p. 265-273, Boston, May 1994.
Raj K. Singh, et al.; ACM Computer Communication Review, vol. 24, No. 3, p. 8-17, Jul. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Joe Touch, et al.; "Host-based Routing Using Peer DMA," Gigabit Networking Workshop '97 Meeting, Kobe, Japan, Apr. 1997, 2pp.
0. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
M. de Vivo, et al.; ACM Computer Communication Review, vol. 29, No. 1, pp. 81-85, Jan. 1999.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.

W. Feng and P. Tinnakornsrisuphap; Proceedings of the 2000 ACM/IEEE conference on Supercomputing, Dallas, Texas, Nov. 4, 2000.

Jenwei Hsieh, et al.; Proceedings of the 2000 ACM/IEEE conference on Supercomputing, Dallas, Texas, Nov. 4, 2000.

Ian Pratt and Keir Fraser; Proceedings of IEEE Infocom 2001, pp. 67-76, Apr. 22, 2001.

Bilic Hrvoye, et al.; Article in Proceedings of the 9th Symposium on High Performance Interconnects, "Deferred Segmentation for Wire-Speed Transmission of Large TCP Frames over Standard GbE Networks," Aug. 22, 2001, 5pp.

Bilic Hrvoye, et al.; Presentation slides from 9th Symposium on High Performance Interconnects, "Deferred Segmentation for Wire-Speed Transmission of Large TCP Frames over Standard GbE Networks," Aug. 22, 2001, 9pp.

Piyush Shivam, et al.; Proceedings of the 2001 ACM/IEEE conference on Supercomputing, pp. 57, Denver, Nov. 10, 2001.

Robert Ross, et al.; Proceedings of the 2001 ACM/IEEE conference on Supercomputing, pp. 11, Denver, Nov. 10, 2001.

Charles Kalmanek; ACM Computer Communication Review, vol. 32, No. 5, pp. 13-19, Nov. 2002.

Jonathan Smith; ACM Computer Communication Review, vol. 32, No. 5, pp. 29-37, Nov. 2002.

NR Adiga, et al.; Proceedings of the 2002 ACM/IEEE conference on Supercomputing, pp. 1-22, Baltimore, Nov. 16, 2002.

Steven J. Sistare, Christopher J. Jackson; Proceedings of the 2002 ACM/IEEE conference on Supercomputing, p. 1-15, Baltimore, Nov. 16, 2002.

Tom Kelly; ACM Computer Communication Review, vol. 33, No. 2, pp. 83-91, Apr. 2003.

Jeffrey C. Mogul; Proceedings of HotOS IX: The 9th Workshop on Hot Topics in Operating Systems, pp. 25-30, May 18, 2003.

Srihari Makineni and Ravi Iyer; Proceedings of the 10th International Symposium on High Performance Computer Architecture, pp. 152, Feb. 14, 2004.

Cheng Jin, et al.; Proceedings of IEEE Infocom 2004, pp. 1246-1259, Mar. 7, 2004.

Greg Regnier, et al.; Computer, IEEE Computer Society, vol. 37, No. 11, pp. 48-58, Nov. 2004.

Sumitha Bhandarkar, et al.; ACM Computer Communication Review, vol. 36, No. 1, pp. 41-50, Jan. 2006.

Ken Calvert; ACM Computer Communication Review, vol. 36, No. 2, pp. 27-30, Apr. 2006.

Jon Crowcroft; ACM Computer Communication Review, vol. 36, No. 2, pp. 51-52, Apr. 2006.

Greg Minshall, et al.; ACM Computer Communication Review, vol. 36, No. 3, pp. 79-92, Jul. 2006.

David Wetherall; ACM Computer Communication Review, vol. 36, No. 3, pp. 77-78, Jul. 2006.

Geoffray P., "Protocol off-loading vs on-loading in high-performance networks," 14th Symposium on High Performance Interconnects, Aug. 23, 2006, 5pp.

Steven Pope, David Riddoch; ACM Computer Communication Review, vol. 37, No. 2, pp. 89-92, Mar. 19, 2007.

Kieran Mansley, et al.; Euro-Par Conference 2007, pp. 224-233, Rennes, France, Aug. 28, 2007.

M. Kaiserswerth; IEEE/ACM Transactions in Networking vol. 1, Issue 6, pp. 650-663, Dec. 1993.

Danny Cohen, et al.; ACM Computer Communication Review, vol. 23, No. 4, p. 32-44, Jul. 1993.

M.V. Wilkes and R.M. Needham; ACM SIGOPS Operating Systems Review, vol. 14, Issue 1, pp. 21-29, Jan. 1980.

Dickman, L., "Protocol OffLoading vs OnLoading in High Performance Networks," 14th Symposium on High Performance Interconnects, Aug. 23, 2006, 8pp.

Mogul J., "TCP offload is a dumb idea whose time has come," USENIX Assoc., Proceedings of HotOS Ix: The 9th Workshop on Hot Topics in Operating Systems, May 2003, pp. 24-30.

Petrini F., "Protocol Off-loading vs On-loading in High-Performance Networks," 14th Symposium on High Performance Interconnects, Aug. 23, 2006, 4pp.

Regnier G., "Protocol Onload vs. Offload," 14th Symposium on High Performance Interconnects, Aug. 23, 2006, 1pp.

Montry G., OpenFabrics Alliance presentation slides, 14th Symposium on High Performance Interconnects, Aug. 23, 2006, 8pp.

\* cited by examiner

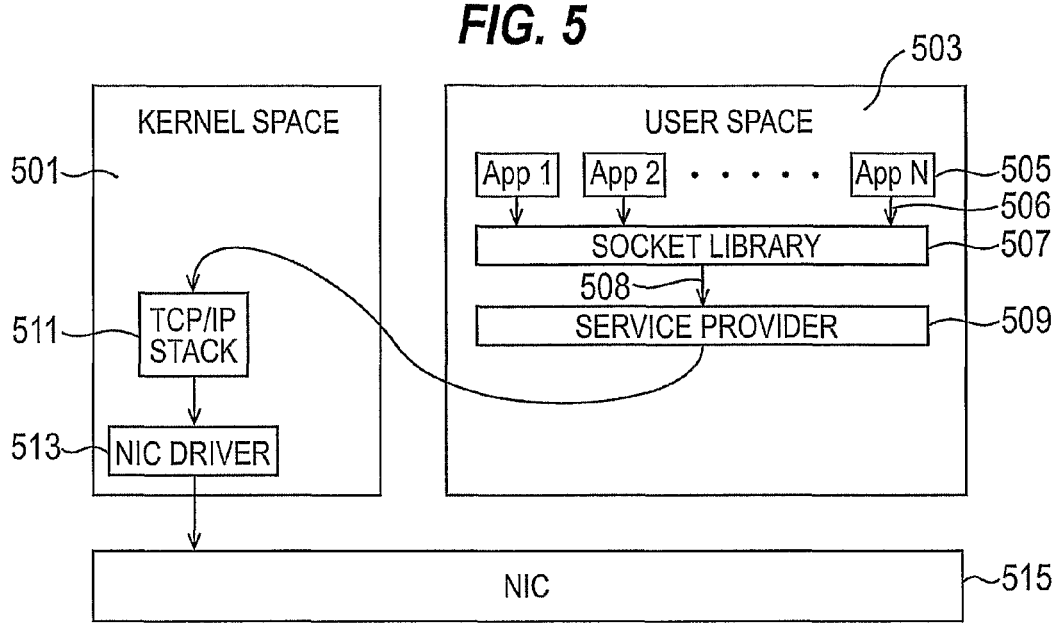
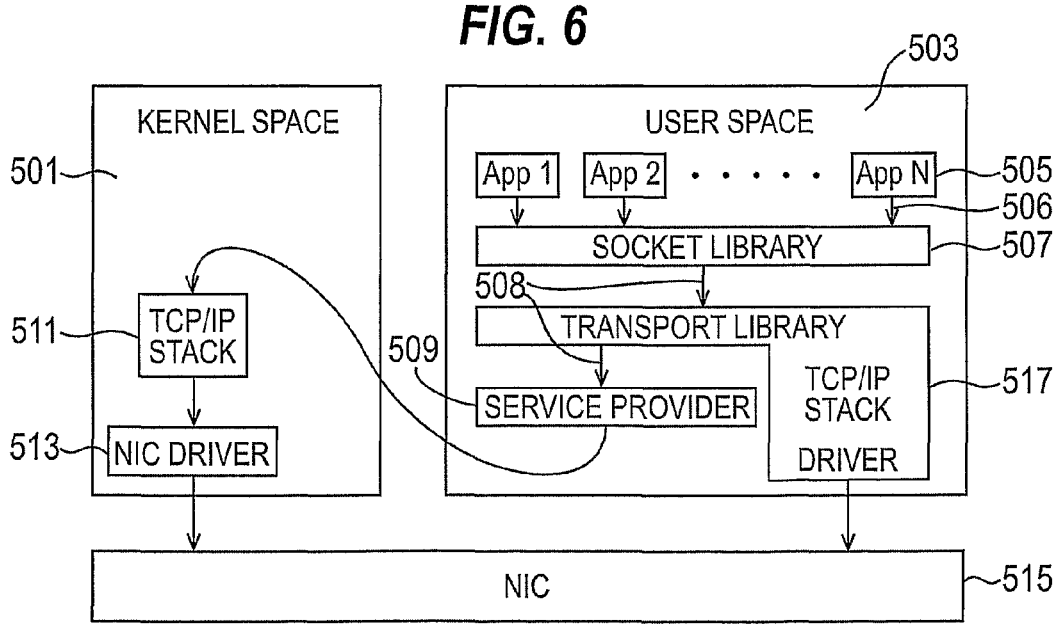

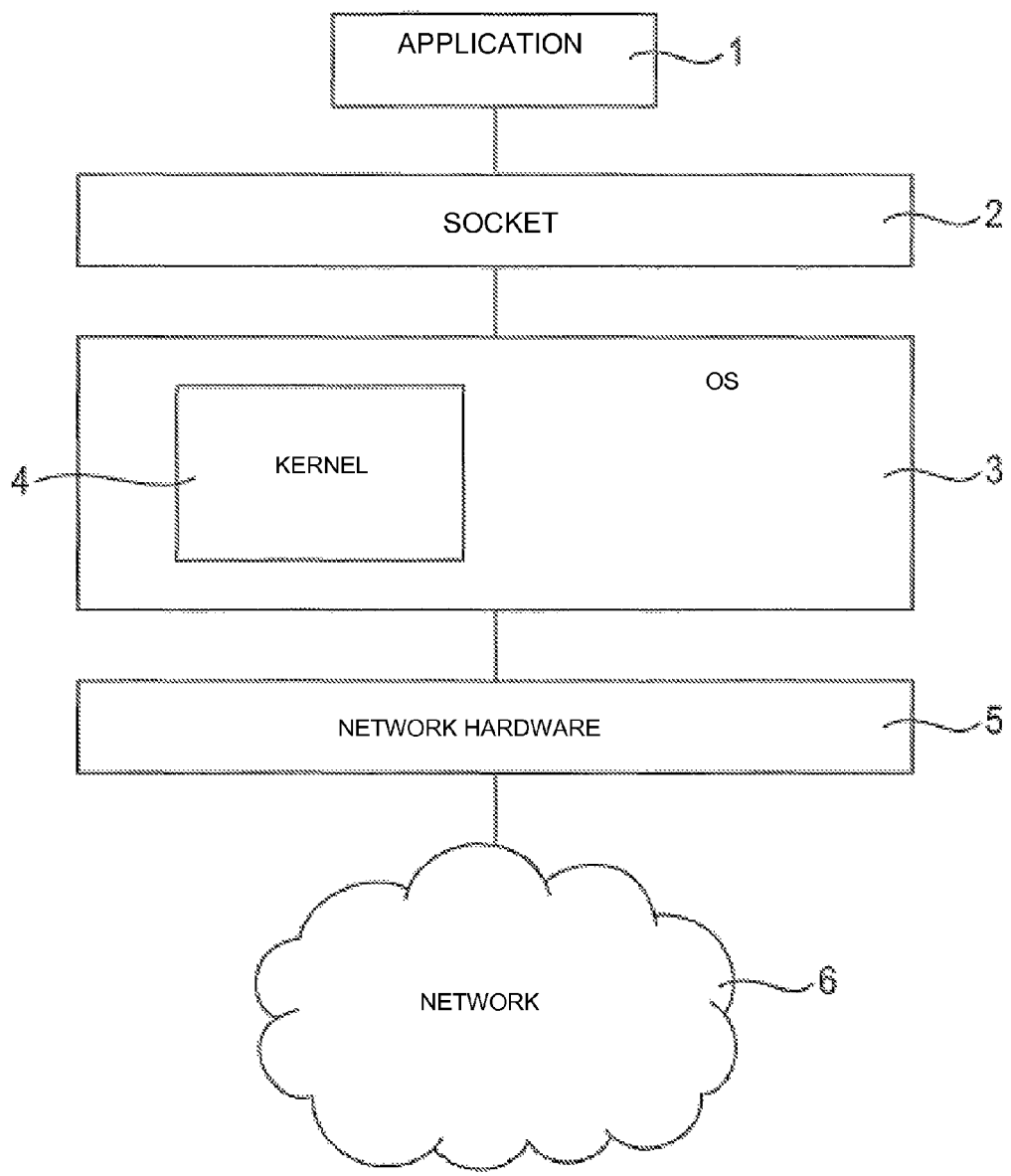

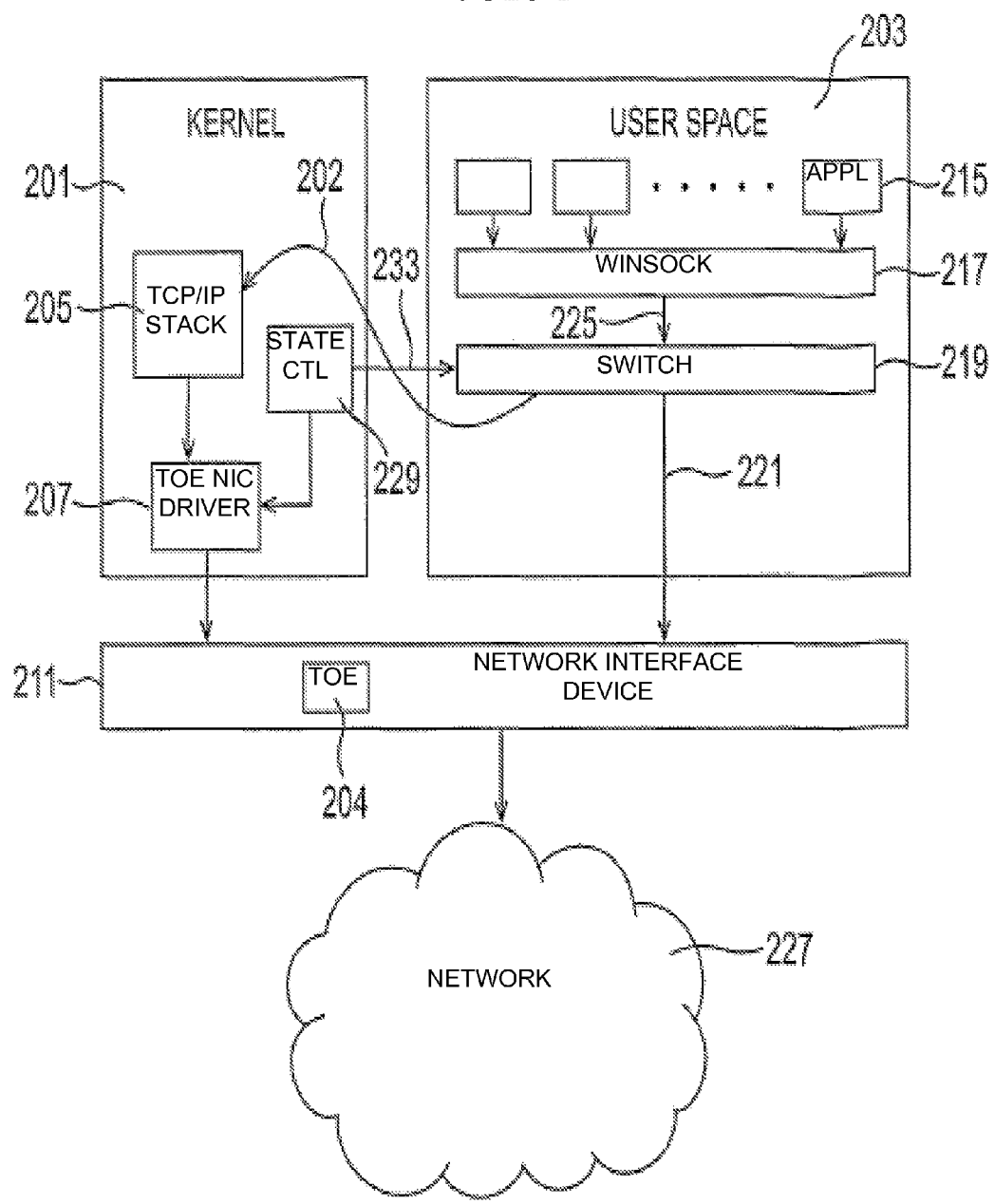

ONLOAD NETWORK PROTOCOL STACKS

SECTION A

Onload Network Protocol Stack

BACKGROUND OF THE INVENTION

This invention relates to the transmission of data across a network by means of a data processing system having access to a network interface device that is capable of supporting a communication link over a network with another network interface device.

FIG. 1 is a schematic diagram showing a network interface device such as a network interface card (NIC) and the general architecture of the system in which it may be used. The network interface device 10 is connected via a data link 5 to a processing device such as computer 1, and via a data link 14 to a data network 20. Further network interface devices such as processing device 30 are also connected to the network, providing interfaces between the network and further processing devices such as processing device 40.

The computer 1 may, for example, be a personal computer, a server or a dedicated processing device such as a data logger or controller. In this example it comprises a processor 2, a program store 4 and a memory 3. The program store stores instructions defining an operating system and applications that can run on that operating system. The operating system provides means such as drivers and interface libraries by means of which applications can access peripheral hardware devices connected to the computer. Drivers and libraries that are external to the operating system may also be provided.

A typical computer system 1 includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral devices must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the processor to trap, change privilege level and enter kernel mode to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching and resulting cache pollution, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

FIG. 2 illustrates one implementation of this. In this architecture the TCP (and other) protocols are implemented twice: as denoted TCP1 and TCP2 in FIG. 2. In a typical operating system TCP2 will be the standard implementation of the TCP protocol that is built into the operating system of the computer. In order to control and/or communicate with the network interface device an application running on the computer may issue API (application programming interface) calls. Some API calls may be handled by the transport libraries that have been provided to support the network interface device. API calls which cannot be serviced by the transport libraries that are available directly to the application can typically be passed on through the interface between the application and the operating system to be handled by the libraries that are available to the operating system. For implementation with many operating systems it is convenient for the transport libraries to use existing Ethernet/IP based control-plane structures: e.g. SNMP and ARP protocols via the OS interface.

There are a number of difficulties in implementing transport protocols at user level. Most implementations to date have been based on porting pre-existing kernel code bases to user level. Examples of these are Arsenic and Jet-stream. However, these have not addressed a number of the problems required to achieve a complete, robust, high-performance commercially viable implementation.

FIG. 3 shows an architecture employing a standard kernel TCP transport (TCPk). The operation of this architecture is as follows.

On packet reception from the network interface hardware (e.g. a network interface card (NIC)), the NIC transfers data into pre-allocated data buffer (a) and invokes the OS interrupt handler by means of the interrupt line. (Step i). The interrupt handler manages the hardware interface e.g. posts new receive buffers and passes the received (in this case Ethernet) packet looking for protocol information. If a packet is identified as destined for a valid protocol e.g. TCP/IP it is passed (not copied) to the appropriate receive protocol processing block. (Step ii).

TCP receive-side processing takes place and the destination part is identified from the packet. If the packet contains valid data for the port then the packet is engaged on the port's data queue (step iii) and that port marked (which may involve the scheduler and the awakening of blocked process) as holding valid data.

The TCP receive processing may require other packets to be transmitted (step iv), for example in the cases that previously transmitted data should be retransmitted or that previously enqueued data (perhaps because the TCP window has opened) can now be transmitted. In this case packets are enqueued with the OS "NDIS" driver for transmission.

In order for an application to retrieve a data buffer it must invoke the OS API (step v), for example by means of a call such as recvo, selects or pollo. This has the effect of informing the application that data has been received and (in the case of a recvo call) copying the data from the kernel buffer to the application's buffer. The copy enables the kernel (OS) to reuse its network buffers, which have special attributes such as being DMA accessible and means that the application does not necessarily have to handle data in units provided by the network, or that the application needs to know a priori the final destination of the data, or that the application must pre-allocate buffers which can then be used for data reception.

It should be noted that on the receive side there are at least two distinct threads of control which interact asynchronously: the up-call from the interrupt and the system call from the application. Many operating systems will also split the up-call to avoid executing too much code at interrupt priority, for example by means of "soft interrupt" or "deferred procedure call" techniques.

The send process behaves similarly except that there is usually one path of execution. The application calls the operating system API (e.g. using a send( )call) with data to be transmitted (Step vi). This call copies data into a kernel data buffer and invokes TCP send processing. Here protocol is applied and fully formed TCP/IP packets are enqueued with the interface driver for transmission.

If successful, the system call returns with an indication of the data scheduled (by the hardware) for transmission. However there are a number of circumstances where data does not become enqueued by the network interface device. For example the transport protocol may queue pending acknowledgements or window updates, and the device driver may queue in software pending data transmission requests to the hardware.

A third flow of control through the system is generated by actions which must be performed on the passing of time. One example is the triggering of retransmission algorithms. Generally the operating system provides all OS modules with time and scheduling services (driven by the hardware clock interrupt), which enable the TCP stack to implement timers on a per-connection basis.

If a standard kernel stack were implemented at user-level then the structure might be generally as shown in FIG. 4. The application is linked with the transport library, rather than directly with the OS interface. The structure is very similar to the kernel stack implementation with services such as timer support provided by user level packages, and the device driver interface replaced with user-level virtual interface module. However in order to provide the model of asynchronous processing required by the TCP implementation there must be a number of active threads of execution within the transport library:

(i) System API calls provided by the application
(ii) Timer generated calls into protocol code
(iii) Management of the virtual network interface and resultant upcalls into protocol code. (ii and iii can be combined for some architectures)

However, this arrangement introduces a number of problems:

(a) Context switching between these threads and implementing locking to protect shared-data structures can involve significant overheads, costing a significant amount of processing time.
(b) The user level timer code generally operates by using timer/time support provided by the operating system. Large overheads caused by system calls from the timer module result in the system failing to satisfy the aim of preventing interaction between the operating system and the data path.
(c) There may be a number of independent applications each of which manages a sub-set of the network connection; some via their own transport libraries and some by existing kernel stack transport libraries. The NIC must be able to efficiently parse packets and deliver them to the appropriate virtual interface (or the OS) based on protocol information such as IP port and host address bits.
(d) It is possible for an application to pass control of a particular network connection to another application, for example during a fork( ) system call on a Unix operating system. This requires that a completely different transport library instance would be required to access connection state. Worse, a number of applications may share a network connection which would mean transport libraries sharing ownership via (inter process communication) techniques. Existing transports at user level do not attempt to support this.
(e) It is common for transport protocols to mandate that a network connection outlives the application to which it is tethered. For example using the TCP protocol, the transport must endeavour to deliver sent, but unacknowledged data and gracefully close a connection when a sending application exits or crashes. This is not a problem with a kernel stack implementation that is able to provide the "timer" input to the protocol stack no matter what the state (or existence) of the application, but is an issue for a transport library which will disappear (possibly ungracefully) if the application exits, crashes, or stopped in a debugger.

Instead of implementing a stack at user-level, some systems offload the TCP stack onto a NIC equipped with a TCP Offload Engine (TOE) for handling the TCP protocol processing. This reduces the load on the system CPU. Typically, data is sent to a TOE-enabled NIC via a TOE-enabled virtual interface driver, by-passing the kernel TCP/IP stack entirely. Data sent along this fast path therefore need only be formatted to meet the requirements of the TOE driver. U.S. patent application Ser. No. 10/844,665 describes a system for interfacing TCP offload engines using an interposed socket library.

However, performing the TCP protocol processing at the NIC requires the NIC to have considerable processing power. This increases expense, especially since embedded processing power on devices such as network interface devices is typically more expensive than main processor power. TOE NICs are therefore more expensive than generic network adapters. Furthermore, data must be formatted twice: firstly at the user-level for the TOE driver, and secondly at the TOE-enabled NIC to form TCP packets.

It would be desirable to provide a system in which TCP protocol processing is performed in user-space on a host CPU (i.e. using the processing means of a computer to which a network interface card is connected) but in which problems (a) to (e) described above are at least partially addressed. Such an implementation is advantageous because it allows a user to take advantage of the price/performance lead of main CPU technology as against co-processors.

SUMMARY OF THE INVENTION

According to a first aspect of the present invention there is provided a method for transmitting data by means of a data processing system, the system supporting an operating system and at least one application and having access to a memory and a network interface device capable of supporting a communication link over a network with another network interface device, the method comprising the steps of: forming by means of the application data to be transmitted; requesting by means of the application a user-mode operating system functionality of the data processing system to direct the data to be transmitted, the request including an indication of a protocol by which the data is to be transmitted; responsive to that request, the user-mode operating system functionality selecting a protocol processing entity in accordance with the indication of a protocol by which the data is to be transmitted; forming within the context of the application by means of the protocol processing entity the data into packets for transmission in accordance with the protocol by which the data is to be transmitted and writing by means of the protocol processing entity the packets to be transmitted to an area of the memory; initiating by means of communication between the protocol processing entity and the network interface device a transmission operation of at least some of the packets over the network.

Preferably the data processing system supports one or more instances of the protocol processing entity, each instance being associated with an application. Alternatively the data processing system supports one or more instances of the protocol processing entity, each instance being associated with a socket requested by an application.

Preferably the user mode operating system functionality is a socket library. Preferably the protocol processing entity is a transport library including a network protocol stack.

The method may further comprise the step of performing stateless protocol processing at the network interface device. Suitably the step of performing stateless protocol processing includes at least one of calculating a checksum, performing a cyclic redundancy check (CRC), performing segmentation tasks, and data encryption.

Preferably the protocol processing entity operates in user mode. Alternatively the protocol processing entity operates in kernel mode.

The operating system may be a Microsoft Windows operating system and the protocol processing entity is provided as a Winsock Service Provider (WSP). Suitably the protocol processing entity communicates with the user-mode operating system functionality via a Service Provider Interface (SPI). Suitably the user-mode operating system functionality is a Winsock dynamic link library.

Preferably the area of the memory is allocated to the protocol processing entity by the operating system in response to a request from the protocol processing entity. Suitably the area of memory is a buffer allocated by the operating system to which the protocol processing entity and network interface device have access.

Suitably the communication between the protocol processing entity and the network interface device is by means of an event placed on an event queue by the network interface device.

The protocol may be TCP/IP.

The method may further comprise the step of, subsequent to the initiating step, accessing the area of the memory by means of the kernel mode operating system and performing at least part of a transmission operation of at least some of the packets over the network by means of the network interface device.

According to a second aspect of the present invention there is provided a method for transmitting data by means of a data processing system, the system supporting an operating system and at least one application and having access to a memory and a network interface device capable of supporting a communication link over a network with another network interface device, the method comprising the steps of: forming by means of an application data to be transmitted; requesting by means of the application a user-mode operating system functionality of the data processing system to direct the data to be transmitted, the request including an indication of a protocol by which the data is to be transmitted; responsive to that request, the user-mode operating system functionality selecting a protocol processing entity in accordance with the indication of a protocol by which the data is to be transmitted; creating an instance of the protocol processing entity; forming within the context of the application by means of the instance of the protocol processing entity the data into packets for transmission in accordance with the protocol by which the data is to be transmitted and writing by means of the instance of the protocol processing entity the packets to be transmitted to an area of the memory; initiating by means of communication between the instance of the protocol processing entity and the network interface device a transmission operation of at least some of the packets over the network.

According to a third aspect of the present invention there is provided a data processing system for transmitting data, the system supporting an operating system and having access to a memory and a network interface device capable of supporting a communication link over a network with another network interface device, the system comprising: an application configured to form data to be transmitted and request a user-mode operating system functionality of the data processing system to direct the data to be transmitted, the request including an indication of a protocol by which the data is to be transmitted; a user-mode operating system functionality configured to select a protocol processing entity in accordance with the indication of a protocol by which the data is to be transmitted in response to the request from the application; a protocol processing entity configured to form within the context of the application the data into packets for transmission in accordance with the protocol by which the data is to be transmitted, to write the packets to be transmitted to an area of the memory and to initiate by means of communication between itself and the network interface device a transmission operation of at least some of the packets over the network.

Preferably the data processing system supports one or more instances of the protocol processing entity, each instance being associated with an application. Alternatively the data processing system supports one or more instances of the protocol processing entity, each instance being associated with a socket requested by an application.

Preferably the operating system is configured to subsequently access the area of the memory and perform at least part of a transmission operation of at least some of the packets over the network by means of the network interface device.

According to a fourth aspect of the present invention there is provided a method for receiving data by means of a data processing system, the system supporting an operating system and at least one application and having access to a memory and a network interface device capable of supporting a communication link over a network with another network interface device, the method comprising the steps of: establishing by means of a protocol processing entity of the data processing system a channel for reception of data by an application, the channel being associated with an area of the memory; writing data packets received at the network interface device to the area of the memory; the protocol processing entity reading the received data packets from the area of the memory and processing the data packets within the context of an application in accordance with a protocol by which the data packets are received so as to extract the data therein; and the application receiving the extracted data from the non-operating-system functionality by means of a user-mode operating system functionality.

Preferably if the protocol processing entity is not responsive to communications from the network interface device, the operating system reads the received data packets from the area of the memory and performs at least part of a transmission operation of at least some of the packets over the network by means of the network interface device.

The method may further comprising the step of performing stateless protocol processing at the network interface device. Suitably the step of performing stateless protocol processing includes at least one of checksum processing, performing a cyclic redundancy check (CRC), performing segmentation tasks, and data encryption.

Suitably the step of the protocol processing entity reading the received data packets from the area of the memory occurs in response to an interrupt set by the network interface device. Alternatively the step of the protocol processing entity reading the received data packets from the area of the memory occurs in response to an event placed on an event queue by the network interface device.

According to a fifth aspect of the present invention there is provided a data processing system for transmitting data, the system supporting an operating system and having access to a memory and a network interface device capable of supporting a communication link over a network with another network interface device, the system comprising: one or more applications each configured to form data to be transmitted and to request a user-mode operating system functionality of the data processing system to direct the data to be transmitted, each request including an indication of a protocol by which that data is to be transmitted; the user-mode operating system functionality being configured to select, in response to each request from an application, a protocol processing entity in accordance with the indication of a protocol included in each request; one or more instances of a protocol processing entity, each instance being associated with an application and configured to form, within the context of that application, data received from that application into packets for transmission in accordance with the protocol by which that data is to be transmitted, to write the packets to be transmitted to an area of the memory and to initiate by means of communication between itself and the network interface device a transmission operation of at least some of the packets over the network.

According to a sixth aspect of the present invention there is provided a data processing system for receiving data, the system supporting an operating system and having access to a memory, the system comprising: a protocol processing entity configured to establish a channel for reception of data by an application, the channel being associated with an area of the memory; a network interface device capable of supporting a communication link over a network with another network interface device and of writing data packets received at the network interface device to the area of the memory; the protocol processing entity being configured to read the received data packets from the area of the memory and process the data packets within the context of an application in accordance with a protocol by which the data packets are received so as to extract the data therein; and the application being configured to receive the extracted data from the non-operating-system functionality by means of a user-mode operating system functionality.

According to a seventh aspect of the present invention there is provided a system for installing a protocol processing entity into a data processing system, the data processing system supporting an operating system and at least one application and having access to a memory and a network interface device capable of supporting a communication link over a network with another network interface device, the system comprising: a protocol processing entity operable to form data into packets for transmission within the context of an application in accordance with a protocol by which the data is to be transmitted, to write the packets to be transmitted to an area of the memory and to initiate by means of communication between itself and the network interface device a transmission operation of at least some of the packets over the network; and an installer configured to install the protocol processing entity into the data processing system; wherein the operating system is one in which an installed protocol processing entity communicates with an application by means of a user-mode operating system functionality.

According to an eighth aspect of the present invention there is provided a system for transmitting or receiving data, the system comprising: a data processing system supporting an operating system and at least one application and having access to a memory, one or more areas of which are allocated for use as buffers in the transfer of data between the data processing system and the network interface device; a network interface device capable of supporting a communication link over a network with another network interface device; the system being operable to: transmit data according to the methods described herein; and receive data according to the methods described herein.

According to a ninth aspect of the present invention there is provided a protocol processing entity for performing network-level protocol processing in a data processing system, the data processing system supporting the Microsoft Windows operating system and at least one application and having access to a network interface device capable of supporting a communication link over a network with another network interface device, the protocol processing entity being embodied as a Winsock Service Provider and being configured to: receive data packets from the network interface device and process the data packets within the context of an application in accordance with a protocol by which the data packets are received so as to extract the data therein; and form within the context of an application data received from that application into packets for transmission in accordance with the protocol by which the data is to be transmitted.

The user-mode operating system functionality and the operating system may be provided by different vendors, but it is important that equivalent functions are provided by the functionality and that it is a user-mode functionality.

DESCRIPTION OF THE DRAWINGS

The present invention will now be described by way of example with reference to the accompanying drawings, in which:

FIG. 5 shows an example of a typical TCP transport architecture;

FIG. 6 shows a TCP transport architecture in accordance with the present invention;

DETAILED DESCRIPTION OF THE DRAWINGS

Figure 1:
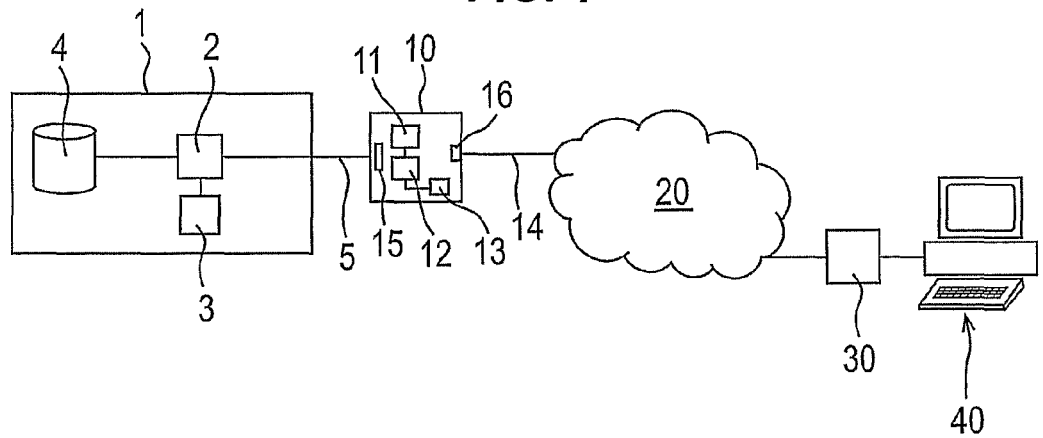
FIG. 1 is a schematic diagram of a network interface device in use.
Figure 2:
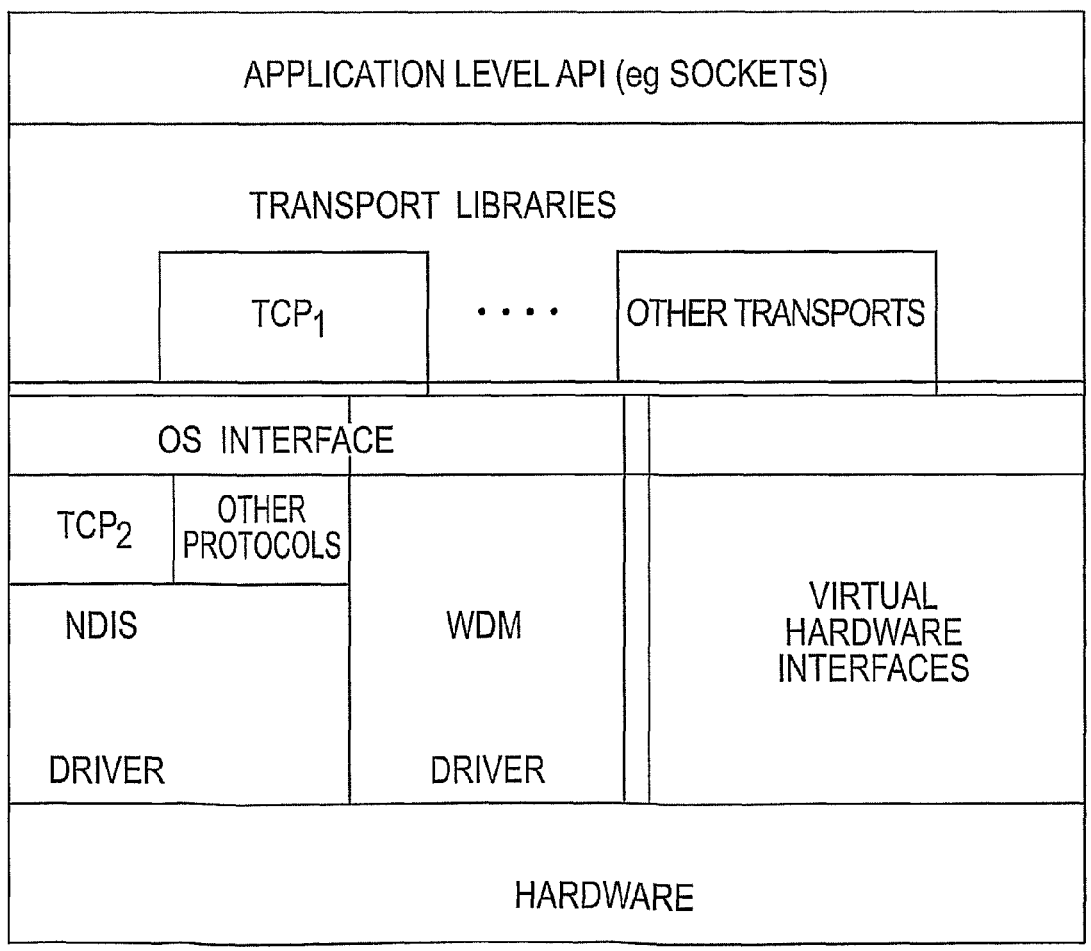
FIG. 2 illustrates an implementation of a transport library architecture.
Figure 3:
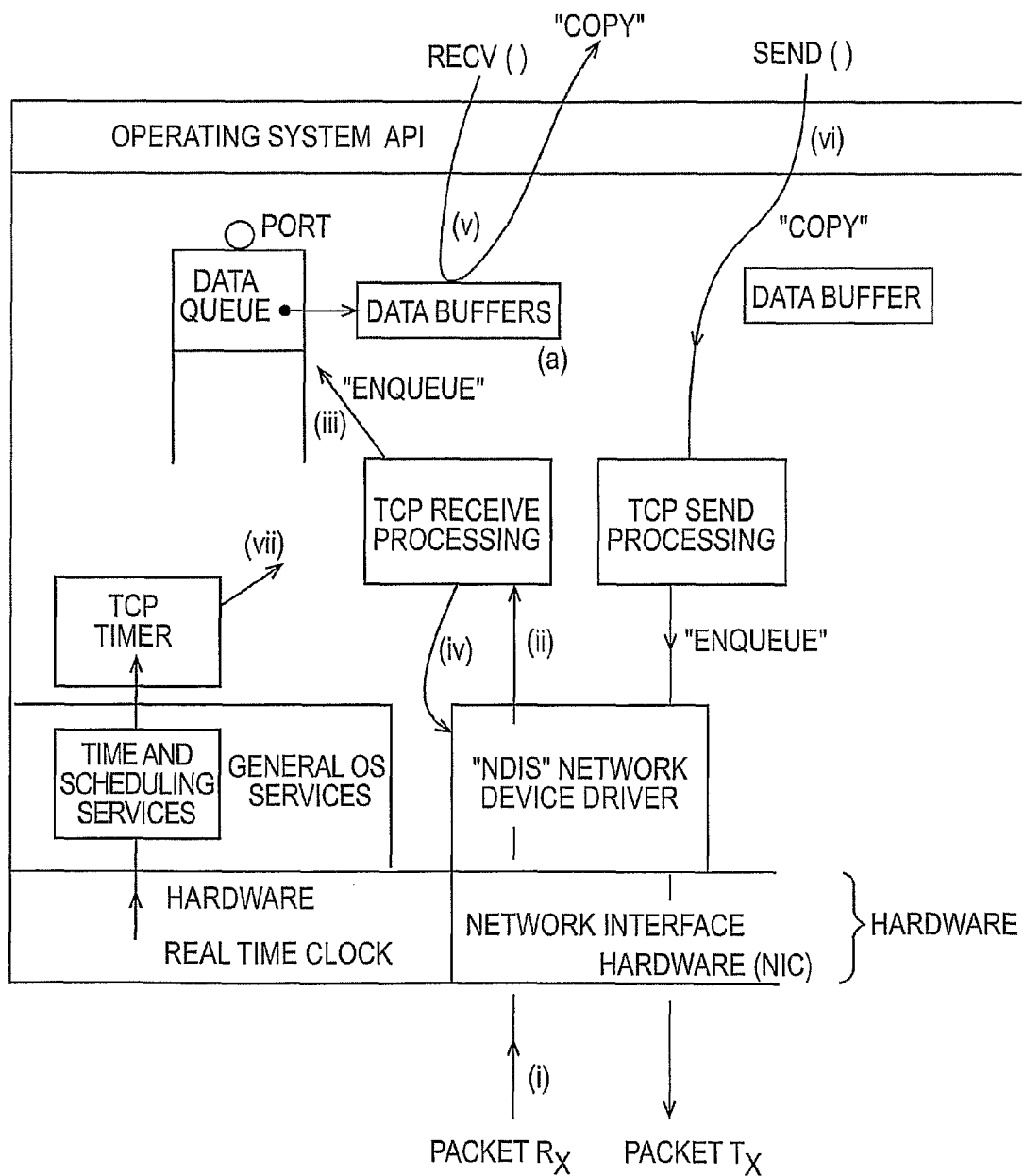
FIG. 3 shows an architecture employing a standard kernel TCP transport with a user level TCP transport.
Figure 4:
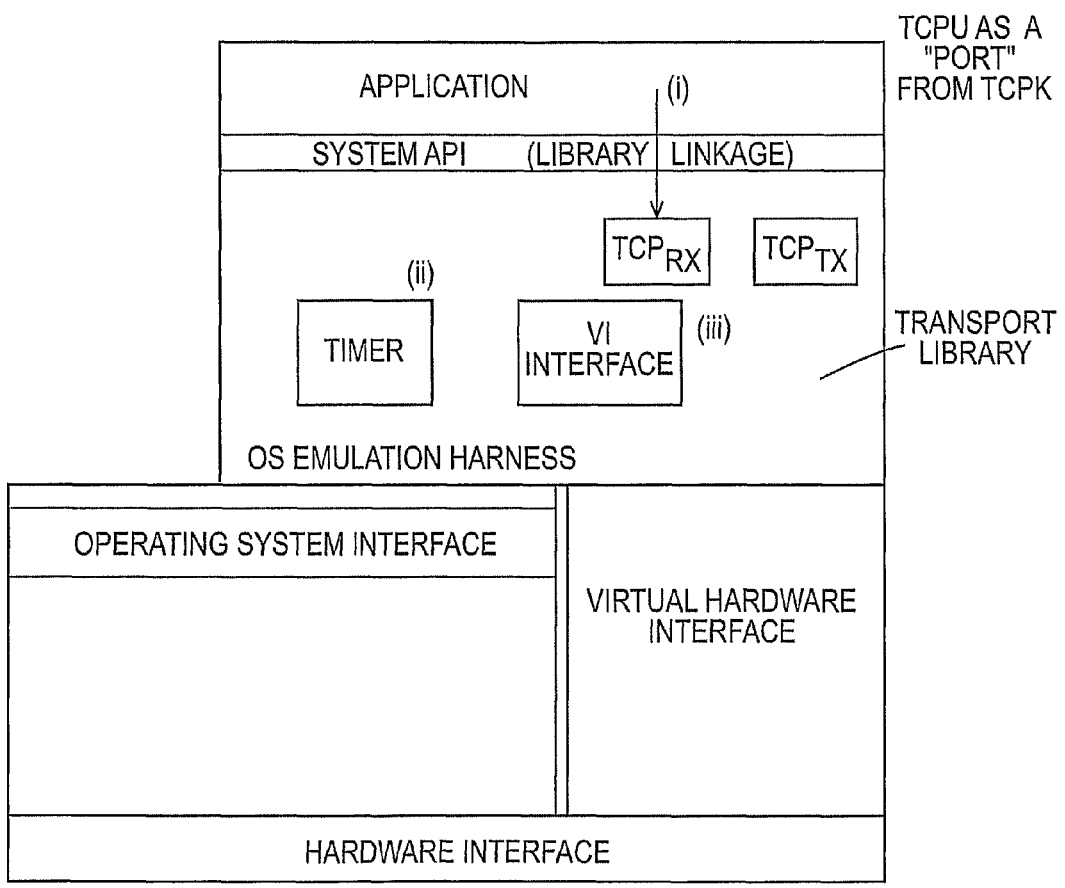
FIG. 4 illustrates an architecture in which a standard kernel stack is implemented at user-level.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

FIG. 5 shows a typical TCP transport architecture for a data processing system. When an application 505 wishes to send data over the network to which NIC 515 is connected, the application sends a request to socket library 507. Under current versions of the Microsoft Windows operating system this request can be sent according to the Winsock API 506 and applications are only therefore required to understand the Winsock API in order to transmit data. One or more transport libraries 509, may be present in the system. In FIG. 5, transport library 509 handles, for example, TCP/IP traffic. Under the Microsoft Windows operating system, a transport library is a Winsock Service Provider (WSP) which interacts with the Winsock via the Service Provider Interface (SPI) 508. Security layers, such as a virus checker, may also be provided as Winsock Service Providers. Transport library 509 directs the data to be sent to the TCP/IP stack 511 of the operating system which resides in kernel space 501. The TCP/IP stack performs the protocol processing and passes the data to the NIC for transmission over the network in accordance with the functionality defined by the NIC driver 513.

Under Microsoft Windows, the operating system maintains a catalogue of the service providers (WSPs) present in the data processing system and the order in which the service provider layers should be applied. Thus a virus checking WSP usually promotes itself as the primary WSP layer so that all data passing via the Winsock is scanned for viruses. When an application requests creation of a socket based on its address family, type and protocol identifier, the Winsock consults the parameters and order of registered WSPs and directs the data flow to the appropriate WSP or sequence of WSPs. A request by an application to transmit data via TCP/IP is therefore directed to a TCP/IP-capable WSP, possibly via WSP-layers offering other data processing or filtering functionality, such as a virus checking WSP. Under the layered WSP model, each WSP interacts with the next WSP in the chain according to the SPI. The chain is terminated by a Base Service Provider which directs all calls it receives to the kernel TCP stack.

A transport architecture in accordance with the present invention includes an onload transport library. An onload transport library is a transport library which is dedicated to an application. An onload transport library performs processing of data for transmission and data received at a network interface device within the context of the application to which it is bound. The processing of data within an onload transport library is therefore temporally close to the application processing the data.

FIG. 6 shows a TCP transport architecture according to an embodiment of the present invention. Socket library 507 receives a socket creation request from an application 505 that wishes to transmit data over the network. Socket library 507 may be provided by the operating system. Socket library 507 preferably operates in user mode. The socket library passes on or directs socket calls to the appropriate transport libraries based on the address family, type or protocol identifier of the requested socket. Transport library 517 is registered with the socket library as operable to handle data in accordance with a particular transport protocol. Preferably, transport library 517 is selected on the basis of the transport protocol by which the data is to be sent. Transport library 517 may be selected on the basis of the address to which data is to be sent.

Onload transport library 517 is a non-operating-system functionality providing a network protocol stack. An instance of the non-operating-system functionality is created for each application having data to send, or for each socket by which data may be sent. The data flows to and from each application may therefore be independently managed by the respective instances of the transport library.

In the embodiments in which the operating system is a Windows operating system, the transport library is preferably a WSP and the socket library is preferably the Windows Winsock. Preferably the transport library is configured to be the primary TCP/IP or UDP/IP WSP. Providing a transport library in accordance with the present invention as a WSP that plugs into the existing Winsock via the SPI interface allows the transport library to benefit from any security or other data filtering layers installed into the operating system. For example, data for transmission by means of the transport library may be first passed through a virus checking WSP. Thus the data transmission system may take advantage of the security measures offered by the operating system and other components installed into it and does not require separate security measures.

The socket library passes on socket calls as appropriate to transport library 517 across SPI interface 508. Transport library 517 includes a TCP/IP stack, with TCP/IP protocol processing being performed in the transport library. This allows the good price:performance ratio of system CPU(s) (as compared to dedicated network card processors) to be fully utilised. Furthermore, in operating the transport library in user mode, no context switching is required in order for an application to transmit data across the network, no interrupts are required for an application to receive data and the processing of data by the application is closely coupled with the execution of the transport library.

A feature of the present invention is that the transport library is provided in an onload configuration. In other words, the protocol processing performed by the transport library is loaded onto the CPU and not off-loaded to a processor on a NIC.

Another feature of the present invention is that a new instance of the transport library is created for each application that requests a connection. Network protocol stacks are therefore defined on a per-application basis. In the most closely coupled onload arrangement, the transport library is a user-mode object and each instance of the transport library is directly associated with a particular application. The application and transport library may be separated by a dynamic link resolved function call. This allows the transport library to carry out protocol processing within the context of the application to which it is bound. However other embodiments of an onloaded configuration are possible. For example, each instance of the transport library may be associated with a particular application, but separated by a system call interface.

In an embodiment of the present invention, the transport library operates in kernel mode but is closely coupled to the application. In this case, the transport library is separated from the application by a system call interface. Many of the benefits of a full user level transport library are provided, but with the exception that there is some context switch overhead. This architecture would be useful where the security policies of the system would not allow a user-level implementation of the transport library.

Under Microsoft Windows, the non-operating-system functionality (the transport library) is preferably implemented as a WSP. The WSP can be thought of as a per-application transport stack. Data is therefore received directly to a subcomponent of an existing operating system socket library. A user-level transport library would therefore receive data from an operating system API.

The stack may be a UDP/IP stack. Could also support any common network protocol configurations.

The transport library retains the ability to pass on a socket call to other transport implementations: for example, to the default TCP/IP transport library of the operating system further down the hierarchy. Data flows may be sent via the kernel stack if the data flow requires processing that cannot be carried out by the hardware or transport library: for example, flows in accordance with a protocol not understood by the hardware or transport library.

Once the protocol processing has been performed in the transport library the data is passed to the NIC for transmission across the network by writing the data to a transmit buffer. Buffers are allocated in memory on the data processor for use in cooperation with the NIC for the transmission and/or reception of data over the network. In the case of a transmit buffer, which is for use in transmitting data, the NIC is configured for reading data from that buffer and transmitting it over the network. The NIC may automatically read that data and transmit it, or it may be triggered to read the data by the transport library or the operating system running on the data processor. The trigger can conveniently be a doorbell write to a location decoded by the NIC which identifies the data structure requiring transmission. In the case of a receive buffer, which is for use in receiving data, the NIC is configured for writing to that buffer data received over the network. The data in the receive buffer may then be read by the transport library or the operating system and further processed by it.

The buffers are most conveniently owned by the operating system, in the sense that it has control over which entities have access to the buffers it has allocated, and/or it has created the buffers, and it is responsible for deleting them. However, both the transport library and the operating system can directly access the buffers for reading data from and writing data to them. The transport library, when operating in an unprivileged (user) mode, is not given access to the physical addresses of these buffers. The transport library may instead use the buffers either by a memory mapping onto the buffer which is provided by the operating system, or else by reference to a virtual address which has been associated with the buffer by the operating system. This association may also be programmed into the NIC by the operating system, thus enabling the unprivileged transport library to safely refer to the buffer when communicating directly to the NIC hardware.

In the case of transmission of data, the application will be expected to write data to a buffer for transmission and then trigger the NIC to read from the buffer to transmit that data. In some situations this alone may be sufficient to allow the data to be transmitted successfully over the network. However, the NIC does not perform protocol processing of transmitted or received data. Instead it is performed by the transport library or the operating system. Therefore if, for instance, the data is not received successfully by the intended recipient the transport library or the operating system must process acknowledgements, retransmission requests etc. (according to the protocol in use) and cause the NIC to perform retransmission. Normally this can be expected to be done by the transport library.

When the NIC has data such as an acknowledgement message or a timeout for the transport library it writes that either to a receive buffer and/or an event queue. At the same time it starts a timer running. When the transport library accesses the buffer/event queue via the transport library it stops and resets the timer. In that way the NIC knows that the transport library is responsive. However, if the timer reaches a predetermined value then the NIC determines that the application is unresponsive and signals the operating system, for example by means of an interrupt, to handle the data for the application. This has a number of advantages. First, the transmission of the data can be progressed by the operating system even if the application is busy or has been descheduled. Second, it gives the transport library the opportunity to intentionally ignore the data, for example by having itself descheduled, once it has placed it on the transmit queue, since the operating system will take over if necessary. Preferably the application controls the length of the timer, for example by setting its initial value. This allows the application to set the timer to suit its priority. The timer is preferably a hardware resource on the NIC to which the application has direct access.

In the case of reception of data, the NIC parses each packet and determines to which transport library (i.e. which receive interface) the packet data should be sent. The NIC will then write the data to the determined receive buffer.

In the case of received data the processing by either the transport library or the operating system will typically involve protocol processing: e.g. checking of packet sequence numbers, executing congestion control and avoidance algorithms and removal of data from the buffer for use by the application. When the transport library handles the protocol processing, the processing usually occurs in the context of the application and temporally close to the processing of the data by the application.

Whilst the buffers are preferably allocated by the operating system, it is convenient for that to be done in response to a request from the transport library on behalf of an application (typically at start of day). Thus, if the received data might overflow the available receive buffers for an application, the transport library can request allocation of further buffers by the operating system.

Preferably a state buffer holds protocol state data that is accessible to the operating system and the transport library. The state buffers can hold event queues of event messages. This allows the operating system to keep track of the state of a connection when the user level transport library is managing the connection.

It should be noted that the transmit and receive buffers defined above are internal to the data processing system, i.e. the buffers are not addressable by entities on the network external to the data processing system. The above system achieves user-level networking or more generally network onloading, without requiring the transfer of information regarding those buffers over the network. Preferably the buffers are addressable only by the NIC and the transport library.

In an embodiment of the present invention, the network interface device can (preferably in hardware) examine the flow of incoming packets. This allows it to identify relevant bit sequences in incoming packets without affecting the flow of data. For TCP and/or UDP packets the identification of bit sequences may, for example, be implemented using a simple decode pipeline because of the simple header layout of such packets. The NIC may therefore direct incoming data to the appropriate receive buffer of an application by identifying a bit sequence in a data stream. There is thus no requirement (as in RDMA) to define buffer names that are valid over the entire network in order for an application to pass data to another application running on another data processing device via a fast data path that does not require data to traverse a kernel network stack.

The principal differences between the architecture of the example of FIG. 6 and conventional architectures are as follows.

(i) TCP code which performs protocol processing on behalf of a network connection is located both in the transport library, and in the OS kernel. The fact that this code performs protocol processing is especially significant.

(ii) Connection state and data buffers are held in kernel memory and memory mapped into the transport library's address space. The operating system is the owner of those buffers, thus having full control over them, but they can be directly accessed by the application for whose communications they are to be used. This enables the application to transmit and receive data directly through those buffers and to read state data from the corresponding state buffer.

(iii) Both kernel and transport library code may access the virtual hardware interface for and on behalf of a particular network connection.

(iv) Timers may be managed through the virtual hardware interface, (these correspond to real timers on the network interface device) without requiring system calls to set and clear them. The NIC generates timer events which are received by the network interface device driver and passed up to the TCP support code for the device.

It should be noted that the TCP support code for the network interface device is in addition to the generic OS TCP implementation. This is suitably able to co-exist with the stack of the network interface device.

The effects of this architecture are as follows.
(a) Requirement for Multiple Threads Active in the Transport Library This requirement is not present for the architecture of FIG. 6 since TCP code can either be executed in the transport library as a result of a system API call (e.g. recv( )) or by the kernel as a result of a timer event. In ether case, the VI (virtual interface) can be managed and both code paths may access connection state or data buffers, whose protection and mutual exclusion may be managed by shared memory locks. As well as allowing the overheads of thread switching at the transport library level to be removed, this feature can prevent the requirement for applications to change their thread and signal-handling assumptions: for example in some situations it can be unacceptable to require a single threaded application to link with a multi-threaded library.

(b) Requirement to Issue System Calls for Timer Management

This requirement is not present for the architecture of FIG. 6 because the network interface device can implement a number of timers which may be allocated to particular virtual interface instances: for example there may be one timer per active TCP transport library. These timers can be made programmable through a memory mapped VI and result in events being issued. Because timers can be set and cleared without a system call—without directly involving the operating system—the overhead for timer management is greatly reduced.

(c) Correct Delivery of Packets to Multiple Transport Libraries

The network interface device can contain or have access to content addressable memory, which can match bits taken from the headers of incoming packets as a parallel hardware match operation. The results of the match can be taken to indicate the destination virtual interface which must be used for delivery, and the hardware can proceed to deliver the packet onto buffers which have been pushed on the VI. A CAM or hash algorithm may be used by hardware to determine which virtual interface to use.

(d) Handover of Connections Between Processes/Applications/Threads

When a network connection is handed over the same system-wide resource handle can be passed between the applications. This could, for example, be a file descriptor. The architecture of the network interface device can attach all state associated with the network connection with that (e.g.) file descriptor and require the transport library to memory map on to this state. Following a handover of a network connection, the new application (whether as an application, thread or process)—even if it is executing within a different address space—is able to memory-map and continue to use the state. Further, by means of the same backing primitive as used between the kernel and transport library any number of applications are able to share use of a network connection with the same semantics as specified by standard system APIs.

(e) Completion of Transport Protocol Operations when the Transport Library is ether Stopped or Killed or Quit.

This step can be achieved in the architecture of the network interface device because connection state and protocol code can remain kernel resident. The OS kernel code can be informed of the change of state of an application in the same manner as the generic TCP (TCPk) protocol stack. An application which is stopped will then not provide a thread to advance protocol execution, but the protocol will continue via timer events, for example as is known for prior art kernel stack protocols.

There are a number of protocols, such as RDMA and iSCSI, which are designed to run in an environment where the TCP and other protocol code executes on the network interface device. Facilities will now be described whereby such protocols can execute on the host CPU (i.e. using the processing means of the computer to which a network interface card is connected). Such an implementation is advantageous because it allows a user to take advantage of the price/performance lead of main CPU technology as against co-processors.

Protocols such as RDMA involve the embedding of framing information and cyclic redundancy check (CRC) data within the TCP stream. While framing information is trivial to calculate within protocol libraries, CRC's (in contrast to checksums) are computationally intensive and best done by hardware. To accommodate this, when a TCP stream is carrying an RDMA or similar encapsulation an option in the virtual interface can be is enabled, for example by means of a flag. On detecting this option, the NIC will parse each packet on transmission, recover the RDMA frame, apply the RDMA CRC algorithm and insert the CRC on the fly during transmission. Analogous procedures can beneficially be used in relation to other protocols, such as iSCSI, that require computationally relatively intensive calculation of error check data.

In line with this system the network interface device can also verify CRCs on received packets using similar logic. This may, for example, be performed in a manner akin to the standard TCP checksum off-load technique.

Protocols such as RDMA also mandate additional operations such as RDMA READ which in conventional implementations require additional intelligence on the network interface device. This type of implementation has led to the general belief that RDMA/TCP should best be implemented by means of a co-processor network interface device. In an architecture of the type described herein, specific hardware filters can be encoded to trap such upper level protocol requests for a particular network connection. In such a circumstance, the NIC can generate an event akin to the timer event in order to request action by software running on the attached computer, as well a delivery data message. By triggering an event in such a way the NIC can achieve the result that either the transport library, or the kernel helper will act on the request immediately. This can avoid the potential problem of kernel extensions not executing until the transport library is scheduled and can be applied to other upper protocols if required.

The RDMA model may be implemented under the optional Microsoft Windows component Winsock Direct (WSD). Winsock Direct bridges the semantic difference between the Winsock API and the RDMA model, providing a direct data path from the Winsock architecture to an RDMA-enabled NIC. Under the WSD model, the interconnect vendor's virtualized hardware driver is provided as an RDMA SAN (System Area Network) Provider. The RDMA SAN Provider allows data to be received from the Winsock Direct Switch (which plugs into the native system Winsock) via an SPI interface and addressed directly to the NIC via the vendor's integrated virtualized hardware driver. An RDMA-enabled NIC performs all statefull protocol processing, typically on a processor on the NIC. This is to be contrasted with the methods in accordance with the present invention, in which statefull protocol processing is performed at the host CPU and preferably in the context of the application to which data is being sent or transmitted from. As described, stateless protocol processing (such as checksum calculations) may be performed on the NIC.

Typically RDMA SANs are connection oriented and require signalling through a non-IP control plane. These operations are implemented within the kernel and a data transfer operation therefore requires the use of kernel system calls. Furthermore, the RDMA model allows a remote application to be given read or write access to a region of memory in an application's address space. Buffers allocated for remote direct memory access must be uniquely named so that they can be referred to over the network. Since buffer resources are finite within a system and since the number of resources required in this model grows as the number of communicating hosts in a cluster grows, the algorithms for efficiently managing this are complex and result in more signalling messages being sent around the network.

The present invention allows the direct transfer of data over a low latency fast path between applications that are remote to one another but without supporting the RDMA model as such. The complexity of an RDMA SAN Provider running under Winsock Direct is not required. For example, no signalling messages to grant or revoke read or write rights to buffers are required. Buffers are allocated by the operating system to a transport library and NIC operating according to the principles of the present invention. Preferably buffers are allocated in response to requests made by the transport library. These requests may be made in response to the creation of new sockets or data flows. Buffers are not therefore allocated to (or addressable by) remote applications or allocated on a connection-oriented basis.

A transport library operable according to the principles of the present invention may exist in a system with the WSD architecture since the WSD switch also plugs into the Winsock via SPI. The transport library may precede or follow the WSD switch layer. Preferably the transport library precedes the WSD switch. The WSD switch may be the Base Service Provider and therefore be located at the end of the WSP chain.

One advantage that has been promoted for co-processor TCP implementations is the ability to perform zero-copy operations on transmit and receive. In practice, provided there is no context switch or other cache or TLB (transmit lookaside buffer) flushing operations on the receive path (as for the architecture described above) there is almost no overhead for a single-copy on receive since this serves the purpose of loading the processor with received data. When the application subsequently accesses the data it is not impacted by cache misses, which would otherwise be the case for a zero copy interface.

However on transmit, a single copy made by the transport library does invoke additional overhead both in processor cycles and in cache pollution. The architecture described above can allow copy on send operations to be avoided if the following mechanisms are, for example, implemented:
(i) transmitted data can be acknowledged quickly (e.g. in a low-latency environment); alternatively
(ii) where data is almost completely acknowledged before all the data in a transfer is sent (e.g. if bandwidth×delay product is smaller than the message size);
(iii) where the data is resident in a kernel owned buffer and cannot be modified by the application (e.g sendfile)

The transport library can simply retain sent buffers until the data from them is acknowledged, and data transmitted without copying. This can also be done when asynchronous networking APIs are used by applications.

Even where data copy is unavoidable, the transport library can use memory copy routines which execute non-temporal stores. These can leave copied data in memory (rather than cache), thus avoiding cache pollution. The data not being in cache would not be expected to affect performance since the next step for transmission will be expected to be DMA of the data by the network interface device, and the performance of this DMA operation is unlikely to be affected by the data being in memory rather than cache.

The network interface device can (preferably in hardware) examine the flow of incoming packets in order that it can in effect parse the network header. This allows it to identify relevant bit sequences in incoming packets without affecting the flow of data. The NIC may then determine the appropriate receive buffer for a packet by:
1. Identifying the relevant bit sequences. This can be done using a simple decode pipeline, or for more flexibility (for example, to support multiple protocols) using a flexible packet parsing engine (a simple CPU).
2. Matching the identified bits. This can be done using a Content Addressable Memory (CAM) or a hash table.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

SECTION B

Chimney Onload Implementation of Network Protocol Stack

BACKGROUND OF THE INVENTION

This invention relates to the transmission of data across a network by means of a data processing system having access to a network interface device that is capable of supporting a communication link over a network with another network interface device.

FIG. 7 represents equipment capable of implementing a prior art protocol stack, such as a transmission control protocol (TCP) stack in a computer connected to a network 6. The equipment includes an application 1, a socket 2 and an operating system 3 incorporating a kernel 4. The socket connects the application to remote entities by means of a network protocol, in this example TCP/IP. The application can send and receive TCP/IP messages by opening a socket and reading and writing data to and from the socket, and the operating system causes the messages to be transported across the network by means of appropriate network hardware 5. For example, the application can invoke a system call (syscall) for transmission of data through the socket and then via the operating system to the network. Syscalls can be thought of as functions taking a series of arguments which cause execution of the CPU to switch to a privileged level and start executing the operating system. Here the syscalls are denoted 1 to N. A given syscall will be composed of a specific list of arguments, and the combination of arguments will vary depending on the type of syscall.

Certain management functions of a data processing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. Alternatively, at least some of the functions usually performed by the operating system may be performed by code running at user level. In a user-level architecture at least some of the state of the function can be stored by the user-level code. This can cause difficulties when an application performs an operation that requires the operating system to interact with or have knowledge of that state.

In particular, state control of networking hardware is conventionally handled by the operating system. Thus applications having data to transmit over the network to which a network interface device is connected must pass their data to the operating system for processing into data packets for transmission over the network. Conventionally the operating system performs all (at least statefull) protocol processing and would therefore handle requests for retransmission, segmentation and reassembly, flow control, congestion avoidance etc.

Alternatively, a protocol stack may be implemented in user mode, with data being passed from the application to the stack for processing and onto the network interface device for transmission without involving the operating system. The stack could be a TCP/IP stack, with most user level TCP/IP stack implementations to date being based on porting pre-existing kernel code bases to user level. Examples of these are Arsenic and Jet-stream. However, these have not addressed a number of the problems required to achieve a complete, robust, high-performance commercially viable implementation.

Instead of implementing a stack at user-level, some systems offload the TCP stack onto a NIC equipped with a TCP Offload Engine (TOE) for handling the TCP protocol processing. This reduces the load on the system CPU. Typically, data is sent to a TOE-enabled NIC via a TOE-enabled virtual interface driver, by-passing the kernel TCP/IP stack entirely. Data sent along this fast path therefore need only be formatted to meet the requirements of the TOE driver.

Alacritech, Inc. has developed a range of network interface cards having TCP offload engines. Various aspects of the Alacritech network interface cards and associated technologies are described in US patent applications having the following publication numbers: U.S. Pat. No. 6,226,680, U.S. Pat. No. 6,247,060, U.S. Pat. No. 6,334,153, U.S. Pat. No. 6,389,479, U.S. Pat. No. 6,393,487, U.S. Pat. No. 6,427,171, U.S. Pat. No. 6,427,173, U.S. Pat. No. 6,434,620, U.S. Pat. No. 6,470,415, U.S. Pat. No. 6,591,302.

However, performing the TCP protocol processing at the NIC requires the NIC to have considerable processing power. This increases expense, especially since embedded processing power on devices such as network interface devices is typically more expensive than main processor power. TOE NICs are therefore more expensive than generic network adapters. Furthermore, data must be processed twice: firstly at the top edge of the TOE driver, and secondly at the TOE-enabled NIC to form TCP packets.

The network architecture of the latest Microsoft Windows operating system will support TOE-enabled NICs. Collectively the network architecture is known as Chimney. Chimney supports both TOE enabled network devices and TOE/RDMA enabled network devices, with TOE/RDMA enabled network devices being able to interpret the RDMA protocols and deliver data directly into user-level buffers, in addition to running a TCP stack on a CPU embedded on the network device.

Under the Chimney model a network connection to a remote computer is always first negotiated using the default kernel TCP/IP stack. The use of additional protocols (such as RDMA) is then progressively negotiated. The kernel stack may hand over control of a given TCP/IP data flow if the flow matches certain conditions. For example, the kernel stack may hand over control of a data flow to a TOE-enabled NIC if the flow is long lived or if large amounts of data are being transferred. This allows the flow to take advantage of the fast data path provided by the interface and shown in FIG. 8. Alternatively, the flow may be handed over to the NIC in dependence on the destination address of the data, or after a predetermined amount of time. Or simply on a per-port basis where the ports are decided by the operator.

The handover is initiated by the operating system sending a state handover message to the network interface device via the driver interface of the network device. The state handover messaging forms part of Network Driver Interface Specification (NDIS) 6.0, currently in development by Microsoft. The NDIS API interfaces vendor specific driver code to the core operating system and provides the state update interface in the Chimney model.

In response to a state handover message received from the operating system, a driver for the TOE-enabled NIC that is to take over protocol processing from the operating system configures that NIC to handle the TCP/IP flow indicated in the state handover message. Furthermore, the operating system configures the sockets library layer to direct traffic data from the application via a fast data path which avoids the kernel TCP/IP stack. Thus, the transfer of state to the NIC allows data transfers over the fast path to entirely bypass the operating system.

Over the fast data path, traffic data from an application is directed by the sockets layer to the Chimney switch (which is essentially a WSP embodying operating system functionality). The switch allows data to be sent directly to a TOE-enabled NIC via the TOE virtual hardware interface, bypassing the kernel TCP/IP stack.

For a TOE only chimney the kernel TCP/IP stack can be bypassed by the operating system and for an RDMA/TOE chimney, communication over the fast data path between the switch and NIC is achieved by means of the Sockets Direct Protocol (SDP). SDP is also a messaging protocol by which RDMA is achieved. The switch may be a base service provider (i.e. the lowest level WSP). Other similar alternatives are possible such as RDMA via a protocol called Winsock Direct Protocol (WSD) although it is currently unclear whether this protocol would be incorporated into a Chimney architecture.

Chimney preserves the sockets interface (Winsock) used by applications to request transmission of traffic data. When an application wishes to send data over the network to which a NIC is connected, the application sends a request to a user-mode library. Under the Microsoft Windows operating system this request is sent according to the Winsock API and applications are only therefore required to understand the Winsock API in order to transmit data. One or more Winsock Service Providers (WSPs) which interact with the Winsock via the Service Provider Interface (SPI) may be present in a system. A WSP may offer a transport library that handles, for example, TCP/IP traffic. Security layers, such as a virus checker, may also be provided as Winsock Service Providers. Typically, a transport library directs the data to be transmitted to a kernel mode protocol stack. The protocol stack performs the protocol processing and passes the data to a NIC for transmission over the appropriate network.

Under Microsoft Windows, the operating system maintains a catalogue of the service providers (WSPs) present in the data processing system and the order in which the service provider layers should be applied. Thus a virus checking WSP usually promotes itself as the primary WSP layer so that all data passing via the Winsock is scanned for viruses. When an application requests creation of a socket based on its address family, type and protocol identifier, the Winsock consults the parameters and order of registered WSPs and directs the data flow to the appropriate WSP or sequence of WSPs. A request by an application to transmit data via TCP/IP is therefore directed to a TCP/IP-capable WSP, possibly via WSP-layers offering other data processing or filtering functionality, such as a virus checking WSP. Under the layered WSP model, each WSP interacts with the next WSP in the chain according to the SPI.

Chimney also supports RDMA via the Sockets Direct Protocol (SDP) that enables direct communication between an application at the sockets layer and a TOE/RDMA network interface card. SDP operates between the Chimney switch and RDMA NIC and emulates sockets streaming semantics, so existing applications that rely on sockets can transparently and without modification take advantage of RDMA-optimized data transfers.

RDMA-enabled NICs are able to interpret RDMA-data plane protocols and deliver data directly into user-level buffers, in addition to running a TCP stack on a processor embedded on the NIC. Under the Chimney model, use of the RDMA protocol is negotiated once a TCP-plane connection has been established using the default kernel TCP/IP stack.

SUMMARY OF THE INVENTION

According to a first aspect of the present invention there is provided a software networking arrangement for operation in a first data processing system, the data processing system comprising: an operating system capable of processing a flow of traffic data received from an application supported by the first data processing system, the operating system being operable in: a first mode, in which the operating system performs protocol processing of a flow of traffic data and then passes the protocol processed data to a network interface device for transmission; and a second mode, in which the operating system does not perform protocol processing of a flow of traffic data, the operating system being arranged to, on entering the second mode, transmit a message to the network interface device indicating that the network interface device is to perform protocol processing of the flow of traffic data; the software networking arrangement comprising: a protocol processing entity; and a driver for a network interface device, the driver being configured to receive said message from the operating system and in response thereto, to configure the protocol processing entity to perform transport-level protocol processing of the flow of traffic data received from an application within the context of that application and then pass the protocol processed data to the network interface device.

Preferably the operating system is operable in the first mode for a first flow of traffic data and in the second mode for a second flow of traffic data, each flow of traffic data being associated with a particular application or socket of an application.

Preferably the driver is arranged to configure the protocol processing entity to perform transport-level protocol processing of the flow of traffic data received from the application by redirecting said message to the protocol processing entity.

Preferably, in response to the driver receiving said message, the software networking arrangement is arranged to create a new instance of the protocol processing entity to process the flow of traffic data received from the application. Alternatively, in response to the driver receiving said message, the software networking arrangement is arranged to create a new instance of the protocol processing entity to process the flow of traffic data received from a socket of the application.

Suitably the operating system is arranged to configure an interface between the application and the protocol processing entity to direct the flow of traffic data from the application to the network interface device.

Preferably, on entering the second mode, the operating system is arranged to cause an interface between the application and the protocol processing entity to direct the flow of traffic data from the application to the protocol processing entity if the protocol processing entity is associated with the driver of the network interface device.

On being configured to perform protocol processing of the flow of traffic data from the application, the protocol processing entity may be arranged to intercept that flow of traffic data from the application to the interface. Alternatively, on being configured to perform protocol processing of the flow of traffic data from the application, the protocol processing entity may be arranged to intercept a flow of data from the interface to the network interface device which corresponds to that flow of traffic data from the application.

Subsequent to being configured to perform protocol processing of the flow of traffic data from the application, the protocol processing entity may be arranged to intercept all flows of traffic data from that application to the interface.

Preferably the interface is a Chimney Switch.

Preferably the protocol processing entity is a user-level protocol processing entity.

Suitably the message is a state handover message. The state handover message may include an indication of the state of the flow of the traffic data.

The flow of traffic data may be associated with a socket of the application.

Preferably network-level protocol processing is performed at the network interface device. Suitably the network-level protocol processing includes calculating a checksum. Suitably the network-level protocol is Internet Protocol (IP). Suitably the IP-level protocol processing includes the DEMUX of packets based on protocol address bits. Preferably all higher-level protocol processing is performed at the protocol processing entity.

Suitably the operating system is Microsoft Windows.

Preferably the protocol processing entity is a Winsock Service Provider. Alternatively the protocol processing entity is a System Area Network provider and the protocol processing entity is arranged to communicate with the interface by means of the Sockets Direct Protocol.

Preferably the operating system is arranged to enter the second mode when the flow of traffic data from the application through the operating system matches one or more predetermined conditions. One of the predetermined conditions may be an elapsed time for which the data flow has been active. One of the predetermined conditions may be an amount of data transferred over the data flow.

The flow of traffic data may be sent over an RDMA connection and the driver may be arranged to configure the protocol processing entity to perform RDMA protocol processing of the flow of traffic data. Preferably the network interface device is arranged to perform stateless RDMA protocol processing. Suitably the stateless RDMA protocol processing includes performing a cyclic redundancy check (CRC).

On being configured to perform RDMA protocol processing, the protocol processing entity may be arranged to signal a second data processing system which terminates the RDMA connection to indicate that the software networking arrangement is operating at the first data processing system. Preferably, if the second data processing system responds to the first data processing system with an indication that it is also operating the software networking arrangement, the protocol processing entities at the first and second data processing systems are arranged to take down the RDMA connection and to subsequently process the transport data in accordance with the underlying transport-layer protocol.

Suitably the transport layer protocol is the TCP protocol.

Suitably the driver is arranged to indicate to the operating system that it represents a network interface device supporting a TCP offload engine. Suitably the driver is arranged to indicate to the operating system that it represents a network interface device supporting an RDMA-TCP offload engine.

The software networking arrangement may be stored on a data carrier.

According to a second aspect of the present invention there is provided a software networking arrangement for operation in a first data processing system, the data processing system comprising: an operating system capable of processing a flow of data packets received at a network interface device for an application supported by the first data processing system, the operating system being operable in: a first mode, in which the operating system performs protocol processing of a flow of data packets and then passes the protocol processed data to the application; and a second mode, in which the operating system does not perform protocol processing of a flow of data packets, the operating system being arranged to, on entering the second mode, transmit a message to the network interface device indicating that the network interface device is to perform protocol processing of the flow of data packets; the software networking arrangement comprising: a protocol processing entity; and a driver for a network interface device, the driver being configured to receive said message from the operating system and, in response thereto, to configure the protocol processing entity to perform transport-level protocol processing of the flow of data packets received at the network interface device and then pass the protocol processed data to the application associated with the flow of data packets, the protocol processing being performed within the context of that application.

Preferably the operating system is arranged to operate in the first mode for a first flow of data packets and in the second mode for a second flow of data packets, each flow of data packets being associated with a particular application or socket of an application.

The software networking arrangement may be stored on a data carrier.

According to a third aspect of the present invention there is provided a method for processing data by means of a data processing system, the system supporting an operating system and at least one application, and having access to a network interface device; the method comprising the steps of: the operating system: receiving a flow of traffic data from an application; performing protocol processing of the flow of traffic data; passing the protocol processed data to the network interface device for transmission; determining that the network interface device is to perform protocol processing of the flow of traffic data received from the application; and transmitting to the network interface device a message indicating that the network interface device is to take over protocol processing of the flow of traffic data; the driver receiving said message from the operating system and in response thereto configuring a protocol processing entity to perform transport-level protocol processing of the flow of traffic data within the context of the application.

Preferably the operating system is arranged to determine that the network interface device is to perform protocol processing of the flow of traffic data when the flow of traffic data from the application through the operating system matches one or more predetermined conditions. One of the predetermined conditions may be an elapsed time for which the data flow has been active. One of the predetermined conditions may be an amount of data transferred over the data flow.

Preferably the driver is arranged to configure the protocol processing entity to perform transport-level protocol processing of the flow of traffic data received from the application by redirecting said message to the protocol processing entity.

Preferably, in response to the driver receiving said message, the software networking arrangement is arranged to create a new instance of the protocol processing entity to process the flow of traffic data received from the application.

Suitably, on entering the second mode, the operating system is arranged to configure an interface between the application and the protocol processing entity to direct the flow of traffic data from the application to the network interface device.

Preferably the operating system is arranged to cause an interface between the application and the protocol processing entity to direct the flow of traffic data from the application to the protocol processing entity if the protocol processing entity is associated with the driver of the network interface device.

According to a fourth aspect of the present invention there is provided a method for processing data by means of a data processing system, the system supporting an operating system and at least one application, and having access to a network interface device; the method comprising the steps of: the operating system: receiving a flow of data packets from the network interface device for an application; performing protocol processing of the flow of data packets; passing the protocol processed data to the application; determining that the network interface device is to perform protocol processing of the flow of data packets received at the network interface device for the application; and transmitting to the network interface device a message indicating that the network interface device is to take over protocol processing of the flow of data packets; the driver receiving said message from the operating system and in response thereto configuring a protocol processing entity to perform transport-level protocol processing of the flow of data packets within the context of the application.

According to a fifth aspect of the present invention there is provided a software networking arrangement for operation in a data processing system, the data processing system comprising: an operating system capable of processing a flow of traffic data received from an application supported by the data processing system, the operating system being operable in: a first mode, in which the operating system performs protocol processing of a flow of traffic data and then passes the protocol processed data to a network interface device for transmission; and a second mode, in which the operating system does not perform protocol processing of a flow of traffic data; wherein the operating system is arranged to, on entering the first mode, transmit a message to the network interface device indicating that the operating system is to perform protocol processing of the flow of traffic data; the software networking arrangement comprising: a protocol processing entity operable to perform transport-level protocol processing of a flow of traffic data received from an application within the context of that application and then pass the protocol processed data to a network interface device; and a driver for that network interface device, the driver being configured to receive said message from the operating system and, if the protocol processing entity is performing protocol processing of the flow of traffic data, to configure the protocol processing entity to cease performing protocol processing of that flow of traffic data.

Preferably the operating system is arranged to operate in the first mode for a first flow of traffic data and in the second mode for a second flow of traffic data, each flow of traffic data being associated with a particular application or socket of an application.

On entering the first mode, the operating system may be arranged to configure an interface between the application and the protocol processing entity to direct the flow of traffic data from the application to the operating system.

Preferably the interface is a Chimney Switch.

Suitably the message is a state reclaim message.

Preferably the driver is arranged to configure the protocol processing entity to cease performing protocol processing of the flow of traffic data by redirecting said message to the protocol processing entity.

The software networking arrangement may be stored on a data carrier.

According to a sixth aspect of the present invention there is provided a method for processing data by means of a data processing system, the system supporting an operating system, a protocol processing entity, at least one application, and having access to a network interface device; the method comprising the steps of: the protocol processing entity: receiving a flow of traffic data from an application; performing transport-level protocol processing of the flow of traffic data within the context of the application; passing the protocol processed data to the network interface device for transmission; determining by means of the operating system that the operating system is to perform protocol processing of the flow of traffic data received from the application; transmitting to the network interface device a message indicating that the operating system is to take over protocol processing of the flow of traffic data; and the driver receiving said message and in response thereto configuring the protocol processing entity to cease performing protocol processing of the flow of traffic data for the application.

According to a seventh aspect of the present invention there is provided a driver for a network interface device, the driver being supported by a data processing system having access to the network interface device, the data processing system further supporting an operating system, at least one application and a protocol processing entity capable of performing protocol processing of a traffic data flow within the context of an application with which the data flow is associated, the driver being operable to: intercept a state handover message sent from the operating system to the network interface device indicating that the network interface device is to take over protocol processing of a traffic data flow; and direct said message to the protocol processing entity so as to cause the protocol processing entity to take over protocol processing of the traffic data flow.

Suitably the driver is arranged to indicate to the operating system that it represents a network interface device supporting a TCP offload engine.

Suitably the driver is arranged to indicate to the operating system that it represents a network interface device supporting an RDMA-TCP offload engine.

The driver may be stored on a data carrier.

DESCRIPTION OF THE DRAWINGS

Figure 9:
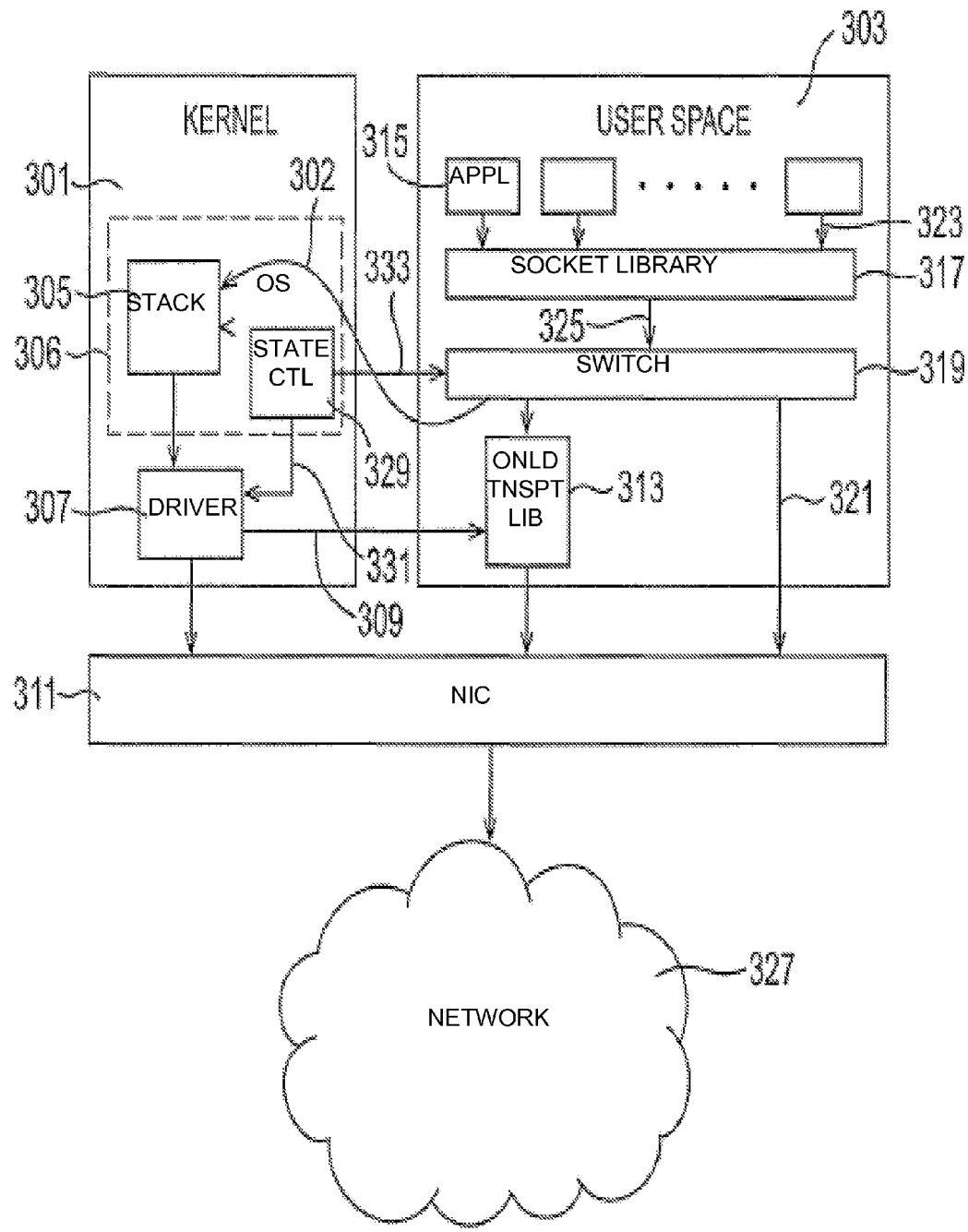

The present invention will now be described by way of example with reference to the accompanying drawings, in which:

FIG. 7 shows a data processing system of the prior art;

FIG. 8 shows a data processing system in accordance with the Chimney network architecture;

FIG. 9 shows a data processing system in accordance with the present invention.

DETAILED DESCRIPTION OF THE DRAWINGS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

FIG. 8 shows a data processing system in accordance with the Chimney network architecture. Winsock 217 receives a request from an application 215 that wishes to send data over network 227. Application 215 communicates with the winsock via the Winsock API. Socket calls received by the winsock are passed onto switch 219, which is a Winsock Service Provider (WSP). Communication between the winsock and switch is over SPI interface 225. The switch may receive data via intermediate WSPs embodying, for example, security layers such as virus checkers.

The switch distributes the data flows in accordance with a directory maintained by the switch that indicates the transport libraries responsible for managing each data flow (i.e. which transport libraries are to perform the protocol processing). The switch updates the directory in response to messages received from the operating system that identify which transport libraries are to manage which data flows.

When a new socket is set up for a TCP/IP connection, the default kernel stack manages the TCP/IP data flow. Thus switch 219 directs the flow of data from the application socket to the kernel TCP/IP stack 205. This is indicated by data flow arrow 202.

In order to relieve the burden of protocol processing from the operating system (and hence the system CPU), the operating system can pass management of a given data flow to TCP/IP Offload Engine (TOE) 204 provided by network interface device 211. To effect the handover, state control entity 229 transmits a state handover message 233 to TOE NIC driver 207. This message forms part of the NDIS messaging functionality. TOE NIC 211 subsequently handles the data flow indicated in the state handover message. In order to provide the TOE NIC with the traffic data for protocol processing and transmission, the state control entity 229 also messages switch 219 to indicate to the switch that subsequent traffic data for the data flow being handed over is to be sent via the fast path 221. The fast path is provided by the SDP architecture, which defines a direct data path between the switch and TOE NIC.

FIG. 9 shows a data processing system in accordance with the present invention. Socket library 317 receives a request from an application 315 that wishes to send data over network 327. Socket library 317 is typically provided by the operating system: in Microsoft Windows, the Windows Socket library (Winsock) is provided. Application 315 communicates with the socket library via interface 323, which in Windows is typically the Winsock API. Socket calls received by the socket library are passed onto switch 319, which in Windows would be a Winsock Service Provider (WSP).

The switch acts to distribute each data flow to the appropriate transport library. When a new socket is requested by an application, the default kernel stack manages the data flow. Thus switch 319 directs the flow of data from the application socket to the kernel stack 305. This is indicated by flow arrow 302.

Operating system 306 is operable to hand over the state of a data flow to a network interface device having protocol-processing capabilities. Typically, the operating system may determine whether or not a given NIC is capable of performing protocol processing by querying the driver of that NIC, or by consulting a system file or registry information.

The present invention allows the operating system to hand over protocol processing to a software-implemented stack by means of the mechanism provided by the operating system to allow the handover of protocol processing to a hardware stack implemented at a protocol-processing NIC. However, a data processing system in accordance with the present invention need not comprise network hardware capable of performing protocol processing.

The operating system may initiate state handover when a data flow matches one or more predetermined scenarios or conditions. These conditions may be: elapsed time since creation of a connection, amount of data transferred over a connection, or any other predetermined condition. A connection may be defined in terms of the socket at which the corresponding data flow terminates, the application at which the corresponding data flow terminates, or by any other identifier of a particular data flow.

A transport architecture in accordance with the present invention includes an onload transport library. An onload transport library is a transport library which is dedicated to an application. An onload transport library performs processing of data for transmission and data received at a network interface device within the context of the application to which it is bound. The processing of data by an onload transport library is temporally close to the application processing the data.

Onload transport library 517 is typically a non-operating-system functionality providing a network protocol stack. An instance of the transport library is preferably created for each application having data to send, or for each socket by which data may be sent. The data flows to and from each application may therefore be independently managed by the respective instances of the transport library.

Transport library 517 includes a TCP/IP stack, with TCP/IP protocol processing being performed in the transport library. This allows the good price:performance ratio of system CPU(s) (as compared to dedicated network card processors) to be fully utilised. Furthermore, in operating the transport library in user mode, no context switching is required in order for an application to transmit data across the network, no interrupts are required for an application to receive data and the processing of data by the application is closely coupled with the execution of the transport library.

Driver 307 is configured to appear to the operating system as a driver for a NIC that is capable of performing protocol processing. Driver 307 may achieve this by supporting those commands which usually allow handover of a connection from the operating system to a protocol-processing NIC. Alternatively or additionally, driver 307 may inform the operating system (by means of a flag, register entry etc.) that NIC 311 is a NIC capable of performing protocol processing.

By passing itself off as a driver for a protocol processing NIC, driver 307 may receive state handover messages from the operating system. When driver 307 receives a state handover message 331 indicating that NIC 311 is to take over management of a particular data flow, the driver redirects the state handover message to an instance of the onload transport library 313 running on the host CPU. Onload transport library 313 is configured to take over management of that particular data flow. A new instance of onload transport library 313 may be created to handle the data flow. Under Windows, onload transport library 313 is preferably a Winsock Service Provider (WSP).

Since driver 307 presents itself to the operating system as a driver for a protocol-processing NIC and since the handover is carried out by means of the usual state handover mechanism, the operating system is typically unaware that the protocol processing is being performed at an onload stack, rather than at a stack supported by a NIC. The present invention therefore allows applications to utilise an onload TCP stack by means of the standard socket interface provided to the applications by the operating system.

The state handover message may be modified by the driver before it is passed onto the onload stack. Instead of the state handover message itself being sent to the onload stack, a message indicating that the driver has received a state handover message may be sent to the onload stack.

Preferably, protocol processing takes place both on the NIC and in the onload transport library. However, transport layer processing is not done on the NIC. In embodiments of the present invention, protocol processing is split such that network-level processing is done on the NIC and all higher level processing is done on the host CPU. The network-level protocol may be Internet Protocol (IP) and the IP-level protocol processing preferably includes the DEMUX of packets based on protocol address bits.

Typically, the state control entity forms part of the operating system. The protocol may be any network protocol. The protocol may be TCP.

In accordance with an embodiment of the present invention, the driver 307 is configured to appear to the operating system that it is a driver for a protocol-processing enabled NIC, and therefore one capable of protocol processing. In fact, the NIC does not need to be capable of protocol processing. Driver 307 appears to the operating system that it is a driver for a TOE-enabled NIC because driver 307 implements the TOE Chimney API—i.e. the instruction set by which the operating system can hand over a connection state. The TOE Chimney API is defined in the latest versions of the Microsoft Scalable Networking Packs.

Preferably onload transport library 313 is registered with an instance of driver 307. Preferably the operating system provides a mechanism for registering a transport library with a driver instance. Upon state handover, the state control entity 329 messages switch 319 to indicate to the switch that subsequent traffic data for the data flow being handed over is to be sent to NIC 311. Since the transport library is registered or in some way associated with driver 307, transport data destined for NIC 311 may be sent via transport library 313 (which in Windows would be a WSP layer). Preferably the operating system provides a mechanism by which a transport library may be associated or registered with a network interface driver. The transport library may therefore perform the protocol processing and pass the at least partially formed data packets to the NIC.

Once the protocol processing has been performed in the transport library the data is passed to the NIC for transmission across the network by writing the data to a transmit buffer. Buffers are allocated in memory on the data processor for use in cooperation with the NIC for the transmission and/or reception of data over the network. In the case of a transmit buffer, which is for use in transmitting data, the NIC is configured for reading data from that buffer and transmitting it over the network. The NIC may automatically read that data and transmit it, or it may be triggered to read the data by the transport library or the operating system running on the data processor. The trigger can conveniently be a doorbell write to a location decoded by the NIC which identifies the data structure requiring transmission. In the case of a receive buffer, which is for use in receiving data, the NIC is configured for writing to that buffer data received over the network. The data in the receive buffer may then be read by the transport library and further processed by it.

In the case of transmission of data, the application will be expected to write data to a buffer for transmission and then trigger the NIC to read from the buffer to transmit that data. In some situations this alone may be sufficient to allow the data to be transmitted successfully over the network. However, the NIC does not perform transport-level protocol processing of transmitted or received data. Instead this is performed by the transport library.

In the case of reception of data, the NIC parses each packet and determines to which transport library (i.e. which receive interface) the packet data should be sent. The NIC will then write the data to the determined receive buffer.

In the case of received data the processing by either the transport library or the operating system will typically involve protocol processing: e.g. checking of packet sequence numbers, executing congestion control and avoidance algorithms and removal of data from the buffer for use by the application. When the transport library handles the protocol processing, the processing preferably occurs in the context of the application.

Whilst the buffers are preferably allocated by the operating system, it is convenient for that to be done in response to a request from the transport library on behalf of an application (typically at start of day). Thus, if the received data might overflow the available receive buffers for an application, the transport library can request allocation of further buffers by the operating system.

It should be noted that the transmit and receive buffers defined above are internal to the data processing system, i.e. the buffers are not addressable by entities on the network external to the data processing system. The above system achieves user-level networking or more generally network onloading, without requiring the transfer of information regarding those buffers over the network. Preferably the buffers are addressable only by the NIC and the transport library.

In one embodiment in which there is no mechanism to register transport library with an instance of the NIC driver, the transport library is configured to catch calls to the switch and determine whether or not they correspond to connections that are managed by the transport library. Those calls which correspond to connections that are managed by the transport library are intercepted and the data flow handled by the transport library (i.e. the traffic data is processed in accordance with the network protocol to be applied and the processed data passed to the NIC for transmission). Under Windows, the transport library may be embodied as a WSP layer which promotes itself so that all calls received at the Winsock pass through the transport layer WSP.

Alternatively, the transport library may be configured to receive data from the switch via the usual fast data path (discussed above in relation to FIG. 8). In other words, the transport library may present an interface to the switch that is compatible with the messaging interface via which data transfer from the switch to a NIC is normally mediated. In Windows the transport library could be embodied as a System Area Network (SAN) Provider and the interface would typically be an SDP interface.

The transport library may be generally operable to intercept calls to the switch and take over management of the corresponding data flows. In this case, the transport library determines which data flows it is to handle and which the operating system is to handle. This may be in addition to any determination performed by the operating system as to whether or not a given data flow is to be off-loaded to a hardware stack.

The transport library may be configured to intercept and handle those data flows for which the data is to be sent in accordance with a particular protocol. Alternatively, the transport library may intercept those data flows relating to a particular application/socket or set of applications/sockets. Alternatively, the transport library may intercept those data flows having any other predetermined characteristics.

In embodiments of the present invention, the operating system may not be a Microsoft Windows operating system. It is not important which messaging API or command interfaces are used, but only that driver 307 is configured to appear to the operating system as a driver for a TOE-enabled NIC that is capable of taking over the management of a data flow.

The term TOE is used throughout this application to refer to a NIC capable of performing protocol processing and managing the state of a connection. However, the protocol according to which data is processed and the connection managed may be any network protocol and is not restricted to being TCP/IP.

The operating system may attempt to reclaim the state of a particular data flow by sending a state reclaim message to driver 307. When operating in accordance with the Chimney architecture, the driver signals to the onload transport library to cease protocol processing and hand over the state of the data flow back to the operating system. The driver may signal the onload transport library by forwarding the (possibly modified) state reclaim message to the transport library. The operating system also configures the Chimney switch to direct further application transport data to the operating system rather than the onload transport library.

In cases in which the onload transport library is configured to intercept calls to the switch, onload transport library may be configured to cease intercepting those calls corresponding to the data flow which the operating system wishes to reclaim. Alternatively, the onload transport library may itself determine whether or not to hand back the state of a data flow to the operating system. The onload transport library would therefore ignore any state reclaim messages from the operating system and continue to intercept those switch calls which it has itself determined to handle.

A feature of the present invention is that the transport library is provided in an onload configuration. In other words, the protocol processing performed by the transport library is loaded onto the CPU and not off-loaded to a processor on a NIC. The transport library performs transport-level protocol processing. Network-level (such as IP) protocol processing may be performed at the NIC and all higher-level protocol processing would be performed at the transport library. This may include TCP and possibly RDMA protocol processing, as required. The protocol processing performed at the NIC may include or be limited to the DEMUX of packets based on protocol address bits and/or the calculation of a checksum.

In embodiments of the present invention, a new instance of the transport library is created for each application that requests a connection. Network protocol stacks are therefore defined on a per-application basis. In the most closely coupled onload arrangement, the transport library is a user-mode object and each instance of the transport library is directly associated with a particular application. The application and transport library may be separated by a dynamic link resolved function call. This allows the transport library to carry out protocol processing within the context of the application to which it is bound. However other embodiments of an onloaded configuration are possible. For example, each instance of the transport library may be associated with a particular application, but separated by a system call interface.

In the case that the transport library is separated from the application by a system call interface, many of the benefits of a full user level transport library are provided, with the exception that there is some context switch overhead. This architecture would be useful where the security policies of the system would not allow a user-level implementation of the transport library.

Under Microsoft Windows, the non-operating-system functionality (the transport library) is preferably implemented as a WSP. The WSP can be thought of as a per-application transport stack. Data is therefore received directly to a subcomponent of an existing operating system socket library. A user-level transport library would therefore receive data from an operating system API. There are a number of protocols, such as RDMA and iSCSI, which are designed to run in an environment where the TCP and other protocol code executes on the network interface device. As described above, the Chimney architecture supports off-loaded protocol processing engines by providing a direct data path between the switch and a suitable virtual hardware interface (usually provided by the hardware vendor). Facilities will now be described whereby such protocols can execute on the host CPU (i.e. using the processing means of the computer to which a network interface card is connected). Such an implementation is advantageous because it allows a user to take advantage of the price/performance lead of main CPU technology as against co-processors.

Protocols such as RDMA involve the embedding of framing information and cyclic redundancy check (CRC) data within the TCP stream. While framing information is trivial to calculate within protocol libraries, CRC's (in contrast to checksums) are computationally intensive and best done by hardware. To accommodate this, when a TCP stream is carrying an RDMA or similar encapsulation an option in the virtual interface can be is enabled, for example by means of a flag. On detecting this option, the NIC will parse each packet on transmission, recover the RDMA frame, apply the RDMA CRC algorithm and insert the CRC on the fly during transmission. Analogous procedures can beneficially be used in relation to other protocols, such as iSCSI, that require computationally relatively intensive calculation of error check data.

In line with this system the network interface device can also verify CRCs on received packets using similar logic. This may, for example, be performed in a manner akin to the standard TCP checksum off-load technique.

Protocols such as RDMA also mandate additional operations such as RDMA READ which in conventional implementations require additional intelligence on the network interface device. This type of implementation has led to the general belief that RDMA/TCP should best be implemented by means of a co-processor network interface device. In an architecture of the type described herein, specific hardware filters can be encoded to trap such upper level protocol requests for a particular network connection. In such a circumstance, the NIC can generate an event akin to the timer event in order to request action by software running on the attached computer, as well a delivery data message. By triggering an event in such a way the NIC can achieve the result that either the transport library, or the kernel helper will act on the request immediately. This can avoid the potential problem of kernel extensions not executing until the transport library is scheduled and can be applied to other upper protocols if required.

An RDMA-enabled NIC performs all statefull protocol processing, typically on a processor on the NIC. This is to be contrasted with the methods in accordance with the present invention, in which statefull protocol processing is performed at the host CPU and preferably in the context of the application to which data is being sent or transmitted from. As described, stateless protocol processing (such as checksum calculations) may be performed on the NIC. Thus, in the preferred embodiments, the onload transport library handles all protocol processing above the network-level (e.g. IP-level). This would include TCP and possibly RDMA processing.

For the operating system to hand over an RDMA connection state to NIC 311, driver 307 is configured to appear to the operating system as a driver for a NIC that is capable of the RDMA performing protocol processing (i.e. an RDMA-TOE NIC). Driver 307 may achieve this by supporting those commands which usually allow handover of a connection from the operating system to an RDMA-TOE NIC. Alternatively or additionally, driver 307 may inform the operating system (by means of a flag, register entry etc.) that NIC 311 is capable of performing the RDMA-level protocol processing. However, in accordance with the principles of the present invention, NIC 311 need not be capable of RDMA processing since the connection state is actually handed over to transport library 307.

Typically RDMA SANs are connection oriented and require signalling through a non-IP control plane. These operations are implemented within the kernel and a data transfer operation therefore requires the use of kernel system calls. Furthermore, the RDMA model allows a remote application to be given read or write access to a region of memory in an application's address space. Buffers allocated for remote direct memory access must be uniquely named so that they can be referred to over the network. Since buffer resources are finite within a system and since the number of resources required in this model grows as the number of communicating hosts in a cluster grows, the algorithms for efficiently managing this are complex and result in more signalling messages being sent around the network.

The present invention allows the direct transfer of data over a low latency fast path between applications that are remote to one another but without supporting the RDMA model as such. The complexity of an RDMA SAN Provider running under the Chimney architecture is not required. For example, no signalling messages to grant or revoke read or write rights to buffers are required. Buffers are allocated by the operating system to a transport library and NIC/driver operating according to the principles of the present invention. Preferably buffers are allocated in response to requests made by the transport library or driver. These requests may be made in response to the creation of new sockets or data flows. Buffers are not therefore allocated to (or addressable by) remote applications or allocated on a connection-oriented basis.

The present invention provides a low-latency data path over which traffic data may be transferred directly into and out of a memory area that is accessible to an application. In comparison, the RDMA architecture introduces significant processing overheads and a complicated buffer structure to achieve memory-to-memory network transfers. It is therefore advantageous in many situations to use the data transfer mechanisms taught herein in favour of conventional RDMA data transfer mechanisms.

In embodiments of the present invention, the transport library determines whether or not an RDMA connection it is supporting is to another data processing system operable in accordance with the present invention (i.e. the connection is supported at each endpoint by a transport library operating in accordance with the present invention). The transport library may perform this determination for an RDMA connection when it is handed that connection by the operating system (e.g. when driver 307 receives an RDMA handover message form the operating system). Operating system 306 typically negotiates an RDMA connection once a data flow is established by means of a lower level protocol (such as TCP/IP). In the case in which the transport library is configured to intercept calls to the switch, the transport library may perform the determination for calls relating to RDMA connections.

The transport library may determine whether or not a particular RDMA connection, or request for an RDMA connection, is between two data processing systems operable in accordance with the present invention by performing additional signalling. The transport library may signal the other endpoint of an RDMA connection in order to determine whether or not it supports a transport library operating in accordance with the present invention. If the other endpoint is also a transport library operating in accordance with the present invention it may signal back to the first transport library a message to that effect. Further signalling may take place between the transport library endpoints in order to establish, for example, which protocol is to be used when the RDMA connection is taken down. The other endpoint may signal that the RDMA connection is to be maintained: if this occurs, it may signal at some later point that it is ready to take down the RDMA connection. Either transport library may periodically signal the other to determine whether or not the other is ready to take down the RDMA connection. Preferably the protocol is TCP/IP. The transport libraries at each end of the connection may use the default mechanisms provided by the operating system to take down the RDMA connection.

Note that driver 307, instead of or in combination with the transport library, may determine whether or not the data processing system it is communicating with across the network by means of RDMA is also operating in accordance with the present invention.

These embodiments allow the net amount of cross network communication to be reduced while retaining the advantages of a low latency data path between memory areas accessible to applications at both ends of a connection.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

SECTION C

Interrupt Management

The present invention relates to a method and system for processing data, and in particular it relates to processing data in accordance with a data transfer protocol.

Figure 10:
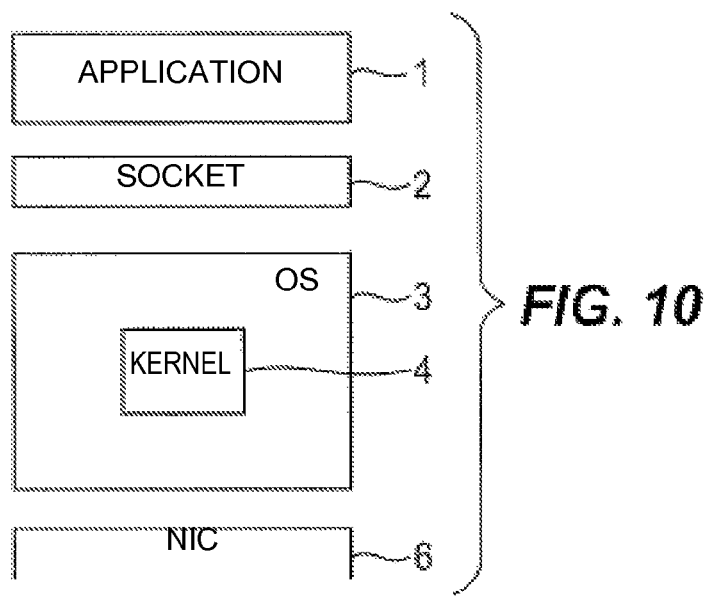

FIG. 10 represents elements of a computer system capable of implementing a conventional protocol stack, such as a transmission control protocol (TCP) stack in a computer connected to a network. The computer system includes an application 1, a socket 2 and an operating system 3 incorporating a kernel 4. A network interface such as a network interface card (NIC) 6 is provided for interfacing between the computer system and the network. The socket 2 connects the application to a remote entity by means of a network protocol, in this example TCP/IP. The application can send and receive TCP/IP messages by opening a socket and reading and writing data to and from the socket, and the operating system causes the messages to be transported across the network via the NIC. One socket is typically provided for each network endpoint with which an application wishes to communicate. The application can invoke a system call (syscall) for transmission of data onto the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource within the context of a process. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter. A system call when invoked causes the operating system to execute algorithms which are specific to the file descriptor identified in the syscall.

In the context of networking, syscalls are used by applications to invoke a stack to send data, and to consume data that has been received, optionally blocking until more data arrives. In this context, a stack is a set of software and/or hardware resources that implement a collection of sockets. Other system calls are used for control plane operations such as creating and destroying sockets, connecting to remote endpoints, and querying the state of sockets.

In a typical network arrangement packets arriving at a NIC are delivered into buffers in host memory, and a notification is sent, in the form of a communication to the NIC's device driver in the operating system kernel. The communication channel by which this communication is delivered typically consists of a queue of notifications that may include notifications of other types of events, including successful transmission of outgoing packets. This communication channel is referred to in the following description as an event queue.

When network events are occurring in the computer system, at some point the device driver must process the event queue by inspecting each event notification and processing the received packets. It is desirable that this happen promptly, since undue delay in the processing of received packets may delay the progress of applications, or may cause the link to go idle. In conventional systems the processing of the event queue is invoked by way of an interrupt generated by the NIC at the time that the event is delivered to the event queue.

An interrupt causes the CPU to save the state of whatever process is currently running, and switch control to an interrupt service routine. This routine processes the event queue, and carries out network processing for the received packets.

Thus network processing is carried out in a timely manner and at high priority in response to packet arrival.

A disadvantage of this mechanism is that interrupts incur high overhead due to the requirement to save and subsequently restore the state of the running process, and to interact with the hardware, and due to the impact on the memory caches in the processor.

It is widely known that performance can be improved by reducing the rate at which interrupts are invoked. One means by which this can be achieved is interrupt moderation, which imposes a minimum time gap between each interrupt. This may delay the processing of received packets slightly, but it means that the overheads of an interrupt are effectively spread over a larger number of event notifications.

Another means to reduce overheads due to interrupts is "Lazy Receiver Processing", discussed at http://www.cs.rice.edu/CS/Systems/LRP/final.html in an article entitled Lazy Receiver Processing: A Network Subsystem Architecture for Server Systems by Peter Druschel and Gaurav Banga. In this model interrupts are not enabled by default. Instead any outstanding event notifications in the event queue are processed when the stack is invoked by the application via a system call. Thus received packets are processed promptly provided the application invokes the stack frequently. When the application is blocked waiting to send or receive on a socket it is not available to process the event queue. To ensure that events will still be handled at this time, interrupts are enabled and the event queue is processed in the conventional way.

A problem with the Lazy Receiver Processing scheme is that if the process does not invoke the stack frequently, and is not blocked waiting for a socket, then the event queue may not get processed in a timely fashion. This can be resolved by providing a kernel thread that is able process the event queue from time-to-time as necessary, as described in the applicant's co-pending PCT application no. PCT/GB06/002202. However, this mechanism may not always be capable of implementation in a way that is both efficient and timely, partly because it involves the use of an additional thread competing with applications for CPU time.

According to a first aspect of the present invention there is provided a method for use in a data processing system connected to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the method comprising: deciding whether to permit the interrupts to be enabled, in dependence on the result of a determination as to the presence of current indications that the stack will be invoked by an entity in the data processing system to cause processing in accordance with the data transfer protocol of network events on the event queues.

According to a second aspect of the present invention there is provided a data processing system capable of connection to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the data processing system being capable of deciding whether to permit the interrupts to be enabled, in dependence on the result of a determination as to the presence of current indications that the stack will be invoked by an entity in the data processing system to cause processing in accordance with the data transfer protocol of network events on the event queues.

According to a third aspect of the present invention there is provided a computer program for use in a data processing system connected to a network in accordance with a data transfer protocol, the data processing system having one or more event queues for holding network events, and being capable of responding to interrupts issued in response to the presence of a network event in the data processing system by invoking a stack to cause processing in accordance with the data transfer protocol of network events on the event queues; the computer program being capable of deciding whether to permit the interrupts to be enabled, in dependence on the result of a determination as to the presence of current indications that the stack will be invoked by an entity in the data processing system to cause processing in accordance with the data transfer protocol of network events on the event queues.

According to a fourth aspect of the present invention there is provided a data carrier bearing a computer program as set out above.

A network event may comprise: (i) an indication of completion of a requested transmission of data from the data processing system; (ii) an indication of receipt at the data processing system of data from the network; or (iii) an indication of a network error.

The data processing system may comprise a network interface for interfacing with the network, and the said interrupts may be issued by the network interface.

The stack may be capable of being invoked directly by an application supported by the data processing system.

Access to at least a part of the stack is preferably restricted by means of a lock, such that only one thread of execution may access the restricted part of the stack concurrently. The said determination may comprise checking the status of the lock to determine whether an application is currently accessing or attempting to access the restricted part of the stack. When the step of checking the status of the lock results in an indication that an application is currently accessing or attempting to access the restricted part of the stack, the said step of deciding preferably results in a decision not to permit interrupts to be enabled.

The method may further comprise the step of maintaining state to indicate whether interrupts are currently enabled. The said determination may comprise the step of checking the state to determine whether interrupts are currently enabled. When the step of checking the state results in an indication that interrupts are currently enabled, the said step of deciding preferably results in a decision not to permit interrupts to be enabled.

The data processing system may support application blocking, and processing in accordance with the data transfer protocol of network events in the event queues may cause waking of blocked applications associated with the network events on which the processing was performed. The said determination may comprise checking whether recent processing in accordance with the data transfer protocol of network events in the event queues caused the waking of any blocked applications. When the step of checking whether recent processing caused the waking of any blocked applications results in an indication that blocked applications were woken, the said step of deciding preferably results in a decision not to permit interrupts to be enabled.

The said entity may be an application process or a routine invoked in response to an interrupt.

According to a fifth aspect of the present invention there is provided a method for use in a data processing system connected by means of one or more sockets to a network in accordance with a data transfer protocol, the data processing system having one or more event queues for holding network events, each network event being associated with at least one of the sockets, and the data processing system being capable of responding to interrupts issued in response to the presence of a network event in the data processing system by invoking a stack to cause processing in accordance with the data transfer protocol of network events on the event queues, wherein such processing can cause a change in a status of one or more of the sockets, the method comprising the steps of: receiving an enquiry from an application supported by the data processing system as to the status of at least one of the sockets; in response to receiving the enquiry, determining whether the interrupts are enabled in the data processing system; and in dependence on the result of the determination, deciding whether to perform processing in accordance with the data transfer protocol of network events on the event queues.

According to a sixth aspect of the present invention there is provided a data processing system capable of connection by means of one or more sockets to a network in accordance with a data transfer protocol, the data processing system having one or more event queues for holding network events, each network event being associated with at least one of the sockets, and the data processing system being capable of responding to interrupts issued in response to the presence of a network event in the data processing system by invoking a stack to cause processing in accordance with the data transfer protocol of network events on the event queues, wherein such processing can cause a change in a status of one or more of the sockets, the data processing system being further capable of: receiving an enquiry from an application supported by the data processing system as to the status of at least one of the sockets; in response to receiving the enquiry, determining whether the interrupts are enabled in the data processing system; and in dependence on the result of the determination, deciding whether to perform processing in accordance with the data transfer protocol of network events on the event queues.

According to a seventh aspect of the present invention there is provided a computer program for use in a data processing system connected by means of one or more sockets to a network in accordance with a data transfer protocol, the data processing system having one or more event queues for holding network events, each network event being associated with at least one of the sockets, and the data processing system being capable of responding to interrupts issued in response to the presence of a network event in the data processing system by invoking a stack to cause processing in accordance with the data transfer protocol of network events on the event queues, wherein such processing can cause a change in a status of one or more of the sockets, the data processing system being further capable of receiving an enquiry from an application supported by the data processing system as to the status of at least one of the sockets; and the computer program being capable of: in response to receipt of the enquiry at the data processing system, determining whether the interrupts are enabled in the data processing system; and in dependence on the result of the determination, deciding whether to perform processing in accordance with the data transfer protocol of network events on the event queues.

According to an eighth aspect of the present invention there is provided a data carrier bearing a computer program as set out above.

The method may further comprise the step of, in response to receiving the enquiry, checking the current status of at least one of the sockets and, in dependence on the result of the check deciding whether to block the application until a change occurs in the status of at least one of the sockets.

The said status is preferably an indicator of whether the at least one of the sockets is ready to receive data for transmission over the network or ready to provide to an application data received over the network.

When the result of the determination is positive, the step of deciding preferably results in a decision not to perform the said processing. Conversely, when the result of the determination is negative, the step of deciding preferably results in a decision to perform the said processing.

Access to at least a part of the stack is preferably restricted by means of a lock, such that only one thread of execution may access the restricted part of the stack concurrently. The step of deciding whether to perform the said processing may comprise checking the status of the lock to determine whether an application is currently accessing or attempting to access the restricted part of the stack. When the step of checking the status of the lock results in an indication that an application is currently accessing or attempting to access the restricted part of the stack, the step of deciding preferably results in a decision not to perform the said processing.

The said enquiry may be an enquiry from the group comprising polio, select( ), epoll( ) and GetQueuedCompletionStatus calls.

The method may further comprise the step of returning a response to the application indicating the status of the at least one of the sockets.

The method may further comprise the step of maintaining state indicating whether interrupts are currently enabled, and the step of determining may comprise checking the said state. When the step of checking the said state results in an indication that interrupts are currently enabled, the step of deciding preferably results in a decision not to perform the said processing.

Figure 11:
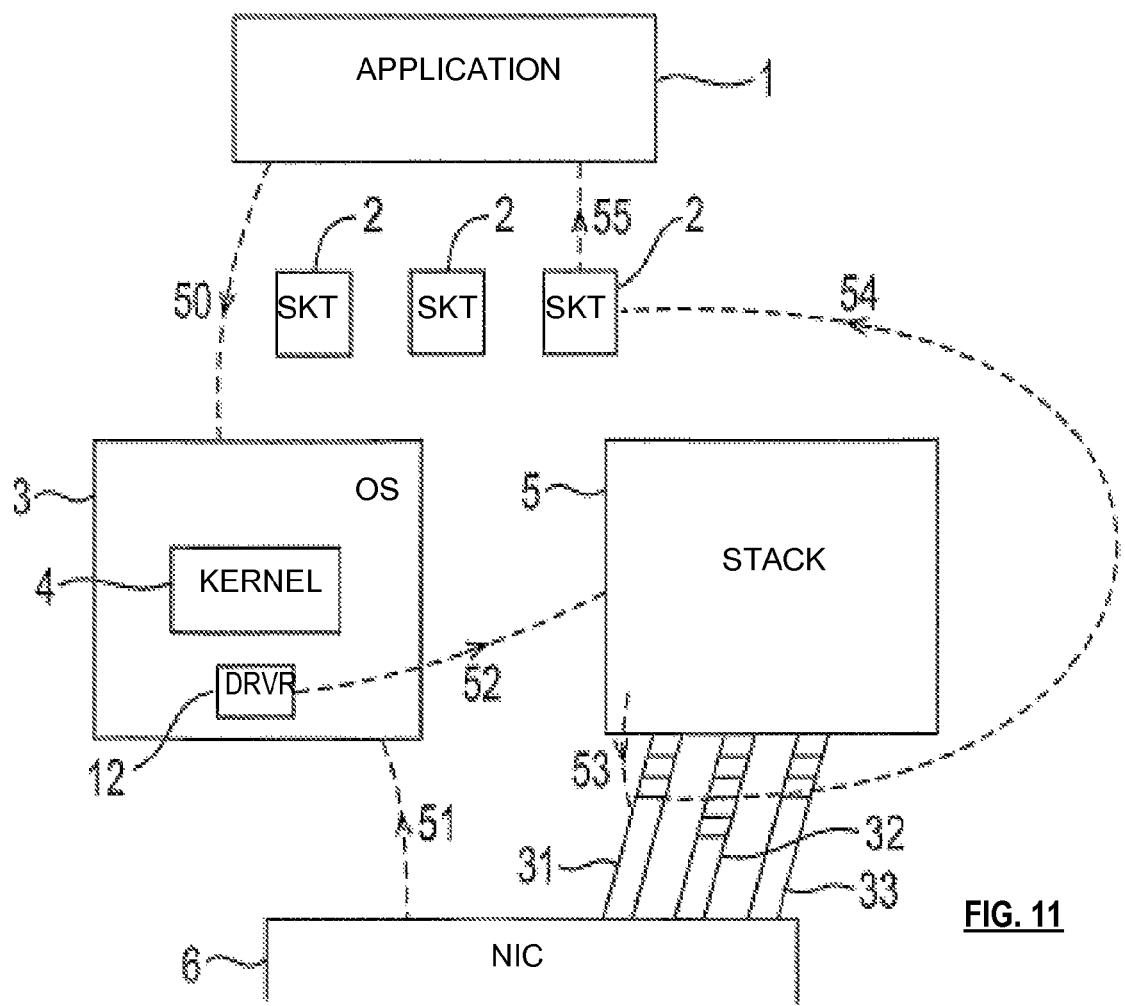

The present invention will now be described by way of example with reference to the accompanying drawings, in which:

FIG. 10 shows a prior art computer system;

FIG. 11 shows a computer system for use with embodiments of the invention; and

Figure 12:
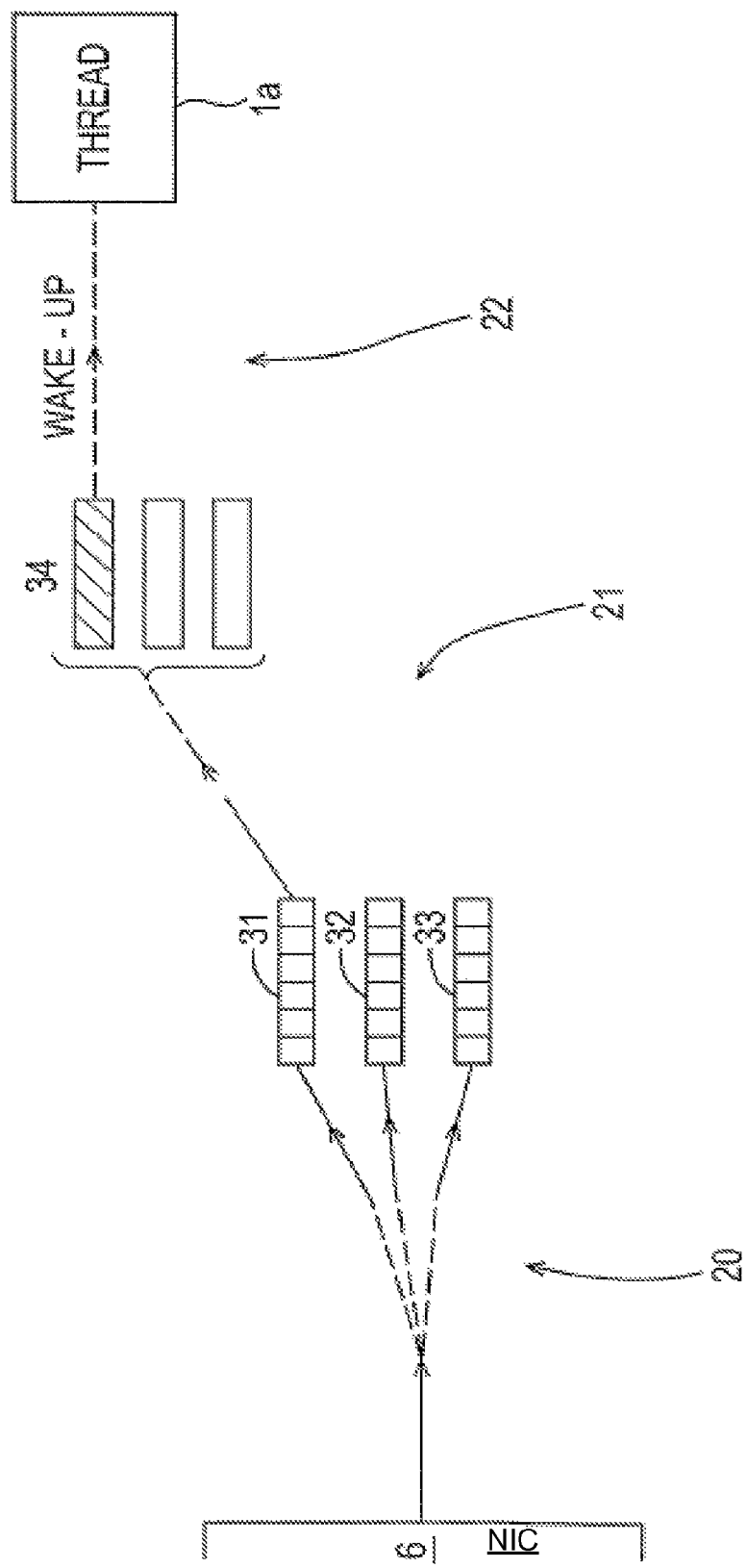

FIG. 12 shows the path of incoming data received at a computer system.

In the exemplary system of FIG. 11, an event queue 31 is provided for a given stack. However it is possible for one stack to manage a number of event queues. Since one stack is capable of supporting a large number of sockets 2, it can therefore occur that a single event queue contains data relating to a number of network endpoints, and thus a single event queue can contain data relating to a number of descriptors. Each application process in the data processing system can be associated with one or more sockets if it is involved in transferring data over the network, and can use one or more stacks.

As mentioned above in the introduction above, data arriving from the network at the NIC 6 is delivered into memory by the NIC, and a notification event is delivered to an event queue with which the data is associated. This step is indicated as 20 in FIG. 12. At some subsequent time, software in the stack 5 will perform network protocol processing on each received packet. The processing of events on the event queues is referred to hereafter as "updating the stack", since it results in any outstanding data in the event queues handled by the stack being processed. Updating the stack causes received packets to be transferred to the appropriate socket (step 21). If the data in the event queue relates to more than one socket, then it will be demultiplexed onto the appropriate sockets.

When a thread wishes to receive data from a particular socket 2, it issues a recvo system call. For this call to operate correctly in general it is necessary that the stack first be brought up-to-date. That is, any events in the event queue must be handled so that received packets will be processed. As a result of the recvo call, any received data available in the socket will be copied into a buffer supplied by the application. If there is no new received data the thread may choose to block inside the recvo call until data arrives. Blocking while awaiting a given condition is a well-known occurrence in data processing systems, and in the preferred embodiment it comprises the following steps:

1) placing the thread in a wait-queue associated with the socket;
2) optionally setting state (for example a flag) to indicate that the wait-queue should be woken when the given condition (e.g. the arrival of new data at a socket) is met;
3) checking that the condition has not yet been met;
4) enabling interrupts for the event queue associated with the socket; and
5) putting the thread "to sleep"—the thread becomes inactive until the wait-queue is woken.

When the given condition occurs, the corresponding wait-queue is signalled, and any threads waiting on the wait-queue become runnable again, i.e. they begin competing for CPU time to carry out required processing. Thus, in the present example, when processed data appears at the relevant socket of the blocking thread 1*a*, the thread will be woken from its wait queue (step 22). Software in the stack 5 can be used to implement the wake-up of waiting threads. The thread 1*a* can then receive the data using a recv( ) call or similar.

The above implementation of a recv( ) call is suitable for an application-driven stack. It is desirable in this case for interrupts to be enabled before the thread is put to sleep to ensure that unprocessed events are not left unprocessed for an undue length of time while the application blocks. In an interrupt-driven stack the implementation of recvo differs only in that it is not first necessary to bring the stack up-to-date, and step 4) is not necessary, because interrupts are always enabled.

The above discussion uses the receipt of data from the network as an example. Corresponding considerations apply to the transmission of data over the network, as will be understood by a skilled person. Specifically, when a thread wishes to push data onto the network, it will first need to determine whether the relevant socket has available space in its transmit buffers so that the data can be passed by the thread to the buffers and then onto the network via the NIC. Thus, in the transmission case, a thread may block until there is sufficient space available in the socket's transmit buffers.

When a process carrying out networking tasks blocks, that process can no longer invoke the stack in order to process newly arrived data. Unprocessed data may therefore build up on the event queue, and this can be inefficient and cause the link to go idle as discussed above. In embodiments of the invention, measures are taken to ensure that incoming data can be processed while the process blocks or is descheduled. Specifically, interrupts are enabled (e.g. at step 4 of the blocking scheme given above) so that as soon as a network event occurs an interrupt service routine will run to enable prompt processing of the event queue by means of the stack.

However, it may not always be desirable to enable interrupts while a process is blocking because interrupts have a high overhead (as explained in the introduction) and it is possible that there may be another process capable of invoking the stack while the first process is blocking, or another blocking process may already have enabled interrupts for the same stack. In such cases, interrupts would be unnecessary and could therefore usefully be avoided.

Embodiments of the present invention can permit greater efficiency by making certain determinations as to the condition of the system and accordingly reducing the use of interrupts as far as possible. A number of techniques are used in this regard:
State (such as a flag) is set to indicate when interrupts are enabled. This can be queried to avoid multiple processes enabling interrupts concurrently for the same stack, which would lead to unnecessary overhead.
Checks are made as to whether the lock used to protect parts of the state of the shared stack is contended. The lock is conventionally implemented to prevent multiple processes from accessing the stack concurrently. If the lock is already being held by a process, then that suggests that the process has invoked (or is likely soon to invoke) the stack and cause processing of the event queue. In such a case, it would be unnecessary for a different process to enable interrupts in respect of the stack.
When a process capable of invoking the stack has just been woken from a blocked state, this is used as an indication that there is a process running, or about to be running, that will keep the stack up-to-date. Interrupts need not be enabled by another process in this situation.

The use of such techniques can provide a relatively low interrupt rate, while ensuring that the stack is kept up-to-date. Keeping the stack up-to-date at all times has the advantage that there is a low overhead for select( ), poll( ) and similar calls, because if there is no backlog of unprocessed data waiting on the event queue then a response can be issued relatively rapidly to such calls. Maintaining an up-to-date stack has the further advantage of enabling efficient network connections, since sockets' transmit buffers are emptied frequently, thereby enabling new data for transmission to be placed on the buffers, and incoming data is processed shortly after it arrives at the event queue so that the process for which it is intended can access it quickly.

Specific implementation details according to a preferred embodiment of the invention will now be discussed.

First, a modified blocking mechanism is used that only enables interrupts under certain conditions. A flag is maintained to indicate whether the lock protecting a part of the stack is currently being held, and this is queried during execution of the blocking mechanism. Specifically, step 4) of the blocking scheme described above includes the following two parts:
4*a*) checking the condition of the stack lock;
4*b*) only if the lock is unlocked, enabling interrupts for the event queue.

It is possible that while a first application is holding the lock to the protected part of the stack, further applications may be attempting to acquire the lock. Such a situation is referred to as lock contention, and the lock may be implemented so as to comprise an indicator of whether further applications are attempting to access the lock concurrently. In the preferred embodiment this indicator is implemented as a single bit of state to represent either "contended" or "uncontended".

In the situation where a first thread of an application is holding the lock while deciding whether to enable interrupts, for example before blocking, it can be useful for that first thread to know whether another thread will take up the lock when the first thread relinquishes it and blocks. If it knows that the lock is contended then the likelihood is that the stack will be invoked by one of the threads currently contending the lock and that protocol processing will be carried out promptly while the first thread blocks. Thus, in the case where a first thread already holds the lock, step 4*b*) could usefully be modified as follows:
4*b*) only if the stack lock is uncontended, enabling interrupts for the event queue.

In the preferred embodiment, the routine for handling interrupts ("interrupt service routine") is a part of the NIC driver 12 in the OS and has the following properties:
It ensures that when a new event arrives at the event queue, software will be invoked to bring the stack up-to-date. The act of updating the stack may cause one or more blocking processes to be woken, for example if data in a received packet is processed and passed to the process's socket, triggering a wake-up call.

It interprets such a waking of a process as an indication that there is currently no requirement for interrupts to be enabled, and accordingly does not re-enable interrupts. This is because the woken process is assumed to be seeking CPU allocation in order to invoke the stack in future, and there is therefore a process available to keep the stack up-to-date.

If no processes are woken as a result of the event queue processing phase, then it re-enables interrupts to ensure that action will be taken promptly in response to the next network event.

It checks the lock protecting the stack. If the lock is locked, it interprets this as an indication that there is a process currently invoking the stack. In this case it does not attempt to bring the stack up-to-date, and does not re-enable interrupts.

An exemplary interrupt service routine for achieving the above features is expressed in pseudo-code below:

```
nic_interrupt_service_routine(stack) {
    do_reenable_interrupts = false;
    if( trylock(stack) ) {
        update_stack(stack);
        unlock(stack);
        if( update_stack_did_not_wake_any_threads )
            do_reenable_interrupts = true;
    }
    if( do_reenable_interrupts )
        enable_interrupts(stack);
    else
        stack->interrupts_enabled = false;
}
```

The trylock operation in the interrupt service routine attempts to acquire the lock required for accessing the stack's event queue. If the lock is available it takes the lock, and if it is unavailable the operation returns false, and the stack is not brought up-to-date.

Operating systems provide a number of APIs to allow processes to manage multiple descriptors. In the multiple descriptor case, each descriptor may identify a socket or another type of resource. The APIs are used to allow a process to determine which among a set of file/socket descriptors are "ready" for I/O (i.e. have received data ready to be consumed, or are ready to transmit). They also typically provide a means to block until at least one of them becomes ready.

Certain known mechansims such as GetQueuedCompletionStatus( ) are used on Microsoft Windows systems. On Unix systems multiple sockets are managed using APIs including select( ), poll( ) and epoll( ). These APIs are implemented by the operating system kernel: when a user process invokes an API call a system call is generated, which causes the CPU to switch to privileged mode and its control is passed to the kernel. A detailed example of code implementing a pollo system call is given in the Appendix below. In each case a set of file/socket descriptors is provided by the process. For each type of file/socket descriptor the kernel invokes a poll hook function in the subsystem that implements the file/socket. This hook must indicate the status of the file/socket (whether or not it is "ready") and must also link the thread to a wait-queue so that it will be woken when the file/socket becomes ready.

As explained above, in order to determine whether a given one of the sockets is ready it is necessary to ensure that the stack is up-to-date. To ensure that the responsible process will be woken promptly when a socket becomes ready it is necessary to ensure the stack will be kept up-to-date, so it is necessary to enable interrupts under certain conditions.

It is not possible to pass state between each invocation of the hook for each socket. This is because the API used for the hook function may be invoked concurrently by more than one thread. As a result, each socket has to be treated independently. However these operations incur significant CPU overhead if they are done on a per-socket basis. The preferred implementation of the invention is intended to minimise that overhead, especially when there are multiple sockets indicated in the set of file descriptors. A poll hook implementation for sockets is shown in terms of psuedo-code below:

```
1  socket_poll_hook(socket) {
2      stack = stack_of(socket);
3      if( interrupts_not_enabled(stack) ) {
4          do_enable_interrupts = true;
5          if( any_events_outstanding(stack) ) {
6              if( trylock(stack) ) {
7                  /* The stack may not be up-to-date. The following brings
8                  ** the stack up-to-date by processing any network
9                  ** events. */
10                 update_stack(stack);
11                 unlock(stack);
12                 if( update_stack_woke_any_threads )
13                     do_enable_interrupts = false;
14             }
15             else
16                 do_enable_interrupts = false;
17         }
18         if( do_enable_interrupts ) enable_interrupts(stack);
19     }
20     link_thread_to_wait_queue(current_thread, socket);
21     return readiness_of(socket);
22 }
```

Whenever the interrupt service routine runs and does not re-enable interrupts, the interrupt flag is cleared. By maintaining a flag in this way, quick checks can be made, for example in line 3 of the poll hook, as to whether interrupts are currently enabled. The flag can be used to efficiently implement select( ), poll( ) and epoll( ) API calls, since the poll hook is designed to update the stack only when interrupts are not enabled. This is useful because interrupts are only enabled when the stack has just been updated, so a positive determination that interrupts are enabled can be used as an indication that the stack is up-to-date. The poll hook therefore has low overhead when interrupts are enabled.

The preferred implementation also takes advantage of the fact that if many sockets are being managed then they are all likely to be in the same stack. Once the hook has run a first time, running it for second and subsequent sockets tends to be very quick because the test on line 3 of the socket_poll_hook( ) is likely to fail. This helps to keep overhead down.

FIG. 11 shows a series of steps summarising the various features of the preferred embodiment described above. Step 50 illustrates an API call such as polio being issued from an application process 1 to cause updating of the stack.

In response to the call from the application, the device driver 12 supporting the network hardware 6 invokes the stack 5 (step 52) to process events on the event queue (step 52). The stack then performs protocol processing of any events in the event queues 31-33 (step 53). In the preferred embodiment, events are notifications identifying incidents that have occurred in respect of the network connections of the computer system. They may include: (i) an indication that a requested transmission of a data packet over the network has been successfully completed; (ii) an indication of the arrival of data at the NIC; or (iii) an indication of a transmission or reception error (e.g. a erroneous packet received). In some implementations, such as where a user-level stack is used, it may be desirable to use additional events including timeouts and wake-ups.

After the events have been processed, packets of data are passed at step 54 to the relevant socket(s) 2. The preferred embodiment provides one socket for each network endpoint to which the computer is connected, although other implementations are possible within the scope of the invention. Similarly, the preferred embodiment uses a stack with one event queue per NIC in a system, although further stacks each with one or more event queues may be implemented if desired.

Once data is placed on the sockets 2 it can be retrieved by the application at step 55 by means of an API call such as recvo.

Step 51 shows the alternative route for invoking the stack in the preferred embodiment. An interrupt is generated by the NIC and causes the CPU to save the context of the currently running process and switch to privileged mode to process the interrupt service routine implemented in the NIC driver 12. This causes the NIC driver to invoke the stack at step 52, and steps 52 to 55 can proceed as described above.

The preferred embodiment involves the generation of interrupts using an indirection. Specifically, the first event to arrive at an event queue following the enablement of interrupts causes a second event to be delivered to a particular event queue designated for interrupt triggering. The second event indicates the event queue at which the first event was received, and may be a wakeup event of type (v) mentioned above. The receipt at the designated event queue of an event of this type triggers an interrupt to be issued from the NIC to the OS, as shown in step 51 of FIG. 11. This indirect interrupt-triggering mechanism has the advantage that only one event queue needs to be configured for triggering interrupts, while the system as a whole can support a plurality of event queues for handling other network events. As an alternative, interrupts could be generated by the NIC directly in response to the receipt of an event at any of the event queues.

It should be noted that the stack 5 shown in FIG. 11 is accessible by the kernel in the preferred embodiment, but could alternatively or in addition be accessible directly by a user application by means of an appropriate call. User-level stacks are discussed in detail in the applicant's co-pending PCT applications WO2004/079981 and WO2005/104475. Embodiments of the invention could provide one stack for each application involved in networking tasks.

It will be appreciated that modifications of the techniques described herein may be made within the scope of the invention to achieve the overall advantage of reducing overhead in a networked data processing system. Similarly, other techniques involving the intelligent use of system conditions may be conceived which also lie within the scope of the invention.

It will also be understood that while TCP has been used herein as an example of a data transmission protocol, the principles of the invention are equally applicable to other protocols.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

APPENDIX TO SECTION C

The following is simplified pseudo-code for the kernel's poll( ) system call, to show how it interacts with the subsystems that implement the file objects identified by file descriptors. poll( ) is invoked with an array "pfds", whose entries specify which file/socket descriptors the application is querying, and are also used to store the result (whether or not that file/socket is "ready").

```
poll_all(pfds) {
    int n_ready = 0;
    for( each pfd in pfds ) {
        file_obj = lookup_file(current_process, pfd->fd);
        pfd->ready = file_obj->subsystem->poll_hook(file_obj);
        if( pfd->ready )  n_ready = n_ready + 1;
    }
    return n_ready;
}
poll(pfds, timeout) {
    loop( forever ) {
        n_ready = poll_all(pfds);
        if( n_ready or nonblocking )   return n_ready;
        block_thread(timeout);
    }
}
```

First, poll( ) calls poll_all( ) to query the subsystem that implements each file/socket to determine whether any are already ready. If any are, or if this is a non-blocking call, it returns immediately. Otherwise it blocks until the thread is woken and then calls poll_all( ) again. The thread is woken when one of the files/sockets changes state. (This will usually, but not always, correspond to one of the files/sockets becoming ready)

This code is invoked by an application at user-level via a system call. The following is a highly simplified example of how a user-level application might use poll

```
/* We are interested in file descriptors 1 and 3. */
pfds[0]->fd = 1;
pfds[1]->fd = 3;
loop( forever ) {
    /* Block until at least one socket is ready. */
    poll(pfds, timeout);
    /* For each socket that is ready, receive some data. */
    for( i = 0; i < len(pfds); i = i + 1 )
        if( pfds[i]->ready )
            recv(pfds[i]->fd, buffer, len(buffer));
}
```

The invention claimed is:

1. A method for transmitting data by means of a data processing system having the Winsock Direct architecture, the system supporting a Microsoft® Windows® operating system and at least one application and having access to a memory and a network interface device capable of supporting a communication link over a network with another network interface device, the method comprising the steps of:
   forming by means of the application data to be transmitted;
   requesting by means of the application a user-mode Winsock socket library of the data processing system to direct the data to be transmitted, the request including an indication of a protocol by which the data is to be transmitted, said protocol being one of TCP/IP and UDP/IP;

responsive to that request, the user-mode Winsock socket library selecting a transport library in accordance with the indication of said protocol, wherein the primary transport library for said protocol is a user-level Winsock Service Provider, and a transport library further down a hierarchy of transport libraries for said protocol is a transport library of the operating system;

forming within the context of the application by means of the Winsock Service Provider the data into packets for transmission in accordance with said protocol and writing by means of the Winsock Service Provider the packets to be transmitted to a buffer allocated by the operating system, wherein said buffer is:
  accessible to the Winsock Service Provider by a memory mapping onto the buffer provided by the operating system,
  accessible to the network interface device by reference to a virtual address associated with said buffer by the operating system and programmed into the network interface device by the operating system and
  not addressable by entities on the network external to the data processing system;

initiating by means of communication between the Winsock Service Provider and the network interface device a transmission operation of at least some of the packets over the network.

2. A method as claimed in claim 1, wherein the data processing system supports one or more instances of the Winsock Service Provider, each instance being associated with an application or a socket requested by an application.

3. A method as claimed in claim 1, further comprising the step of performing stateless protocol processing at the network interface device, the stateless protocol processing including at least one of calculating a checksum, performing a cyclic redundancy check (CRC), performing segmentation tasks, and data encryption.

4. A method as claimed in claim 1, wherein the protocol Winsock Service Provider operates in one of user mode and kernel mode.

5. A method as claimed in claim 1, wherein said buffer is allocated to the Winsock Service Provider in response to a request from the Winsock Service Provider.

6. A method as claimed in claim 1, further comprising the step of: subsequent to the initiating step, accessing the buffer by means of a kernel mode of the operating system and performing at least part of a transmission operation of at least some of the packets over the network by means of the network interface device.

7. A method for transmitting data by means of a data processing system having the Winsock Direct architecture, the system supporting a Microsoft® Windows® operating system and at least one application and having access to a memory and a network interface device capable of supporting a communication link over a network with another network interface device, the method comprising the steps of:

forming by means of an application data to be transmitted;

requesting by means of the application a user-mode Winsock socket library of the data processing system to direct the data to be transmitted, the request including an indication of a protocol by which the data is to be transmitted, said protocol being one of TCP/IP and UDP/IP;

responsive to that request, the Winsock socket library selecting a transport library in accordance with the indication of said protocol, wherein the primary transport library for said protocol is a user-level Winsock Service Provider, and a transport library further down a hierarchy of transport libraries for said protocol is a transport library of the operating system;

creating an instance of the Winsock Service Provider;

forming within the context of the application by means of the instance of the Winsock Service Provider the data into packets for transmission in accordance with said protocol and writing by means of the instance of the Winsock Service Provider the packets to be transmitted to a buffer allocated by the operating system, wherein said buffer is:
  accessible to the Winsock Service Provider by a memory mapping onto the buffer provided by the operating system,
  accessible to the network interface device by reference to a virtual address associated with said buffer by the operating system and programmed into the network interface device by the operating system and
  not addressable by entities on the network external to the data processing system;

initiating by means of communication between the instance of Winsock Service Provider and the network interface device a transmission operation of at least some of the packets over the network.

8. A data processing system for transmitting data, the system supporting a Microsoft® Windows® operating system and having access to a memory and a network interface device capable of supporting a communication link over a network with another network interface device, the system having the Winsock Direct architecture and comprising:

one or more hardware processors executing an application configured to form data to be transmitted and request a user-mode Winsock socket library of the data processing system to direct the data to be transmitted, the request including an indication of a protocol by which the data is to be transmitted, said protocol being one of TCP/IP and UDP/IP;

wherein a primary transport library for said protocol by which the data is to be transmitted is a user-level Winsock Service Provider, and a transport library further down a hierarchy of transport libraries for said protocol is a transport library of the operating system;

the user-mode Winsock socket library being configured to select a transport library in accordance with the indication of said protocol in response to the request from the application;

wherein the Winsock Service Provider is configured to:

form within the context of the application the data into packets for transmission in accordance with said protocol, write the packets to be transmitted to a buffer allocated by the operating system, wherein said buffer is:
  accessible to the Winsock Service Provider by a memory mapping onto the buffer provided by the operating system,
  accessible to the network interface device by reference to a virtual address associated with said buffer by the operating system and programmed into the network interface device by the operating system and
  not addressable by entities on the network external to the data processing system; and initiate by means of communication between itself and the network interface device a transmission operation of at least some of the packets over the network.

9. A method for receiving data by means of a data processing system having the Winsock Direct architecture, the system supporting a Microsoft® Windows® operating system and at least one application and having access to a memory and a network interface device capable of supporting a communication link over a network with another network interface device, the method comprising the steps of:

establishing by means of a transport library of the data processing system a channel for reception of data by an application, the transport library being selected by a user-mode Winsock socket library of the data processing system in accordance with an indication of a protocol by which the data is received, said protocol being one of TCP/IP and UDP/IP, wherein the primary transport library for said protocol is a user-level Winsock Service Provider, and a transport library further down a hierarchy of transport libraries for said protocol is a transport library of the operating system; and the channel being associated with a buffer allocated by the operating system, wherein said buffer is:

accessible to the Winsock Service Provider by a memory mapping onto the buffer provided by the operating system, accessible to the network interface device by reference to a virtual address associated with said buffer by the operating system and programmed into the network interface device by the operating system and not addressable by entities on the network external to the data processing system;

writing data packets received at the network interface device to the said buffer;

the Winsock Service Provider reading the received data packets from the buffer and processing the data packets within the context of an application in accordance with said protocol so as to extract the data therein; and the application receiving the extracted data from the Winsock Service Provider by means of the Winsock socket library.

10. A method as claimed in claim 9, wherein if the Winsock Service Provider is not responsive to communications from the network interface device, the operating system is configured to read the received data packets from the buffer and perform at least part of a reception operation of at least some of the packets over the network by means of the network interface device.

11. A method as claimed in claim 9, further comprising the step of performing stateless protocol processing at the network interface device.

12. A method as claimed in claim 11, wherein the step of performing stateless protocol processing includes at least one of checksum processing, performing a cyclic redundancy check (CRC), performing segmentation tasks, and data encryption.

13. A method as claimed in claim 9, wherein the step of the Winsock Service Provider reading the received data packets from the buffer occurs in response to an interrupt set by the network interface device.

14. A method as claimed in claim 9, wherein the step of the Winsock Service Provider reading the received data packets from the buffer occurs in response to an event placed on an event queue by the network interface device.

15. A data processing system for transmitting data, the system supporting a Microsoft® Windows® operating system and having access to a memory and a network interface device capable of supporting a communication link over a network with another network interface device, the system having the Winsock Direct architecture and comprising:

one or more hardware processors executing one or more applications each configured to form data to be transmitted and to request a user-mode Winsock socket library of the data processing system to direct the data to be transmitted, each request including an indication of a protocol by which that data is to be transmitted, said protocol being one of TCP/IP and UDP/IP;

wherein a primary transport library for said protocol is a user-level Winsock Service Provider and a transport library further down a hierarchy of transport libraries for said protocol is a transport library of the operating system;

the Winsock socket library being configured to select, in response to each request from an application, a transport library in accordance with the indication of a protocol included in each request;

one or more instances of the Winsock Service Provider, each instance being associated with an application and configured to form, within the context of that application, data received from that application into packets for transmission in accordance with the protocol by which that data is to be transmitted, write the packets to be transmitted to a buffer allocated by the operating m wherein said buffer is:

accessible to the Winsock Service Provider by a memory mapping onto the buffer provided by the operating system, accessible to the network interface device by reference to a virtual address associated with said buffer by the operating system and programmed into the network interface device by the operating system and not addressable by entities on the network external to the data processing system; and initiate by means of communication between itself and the network interface device a transmission operation of at least some of the packets over the network.

16. A data processing system for receiving data, the system supporting a Microsoft® Windows® operating system and having access to a memory, the system having the Winsock Direct architecture and comprising:

a transport library configured to establish a channel for reception of data by an application, said application executed by one or more hardware processors, the transport library being selected by a user-mode Winsock socket library of the data processing system in accordance with an indication of a protocol by which the data is received, said protocol being one of TCP/IP and UDP/IP, wherein the primary transport library for said protocol is a user-level Winsock Service Provider, and a transport library further down a hierarchy of transport libraries for said protocol is a transport library of the operating system; and the channel being associated with an area of the memory;

a network interface device capable of supporting a communication link over a network with another network interface device and of writing data packets received at the network interface device to the area of the memory, the area of the memory being a buffer allocated by the operating system, wherein said buffer is:
    accessible to the Winsock Service Provider by a memory mapping onto the buffer provided by the operating system,
    accessible to the network interface device by reference to a virtual address associated with said buffer by the operating system and programmed into the network interface device by the operating system and
    not addressable by entities on the network external to the data processing system;
the Winsock Service Provider being configured to read the received data packets from the buffer and process the data packets within the context of an application in accordance with said protocol so as to extract the data therein; and
the application being configured to receive the extracted data from Winsock Service Provider by means of the Winsock socket library.

17. A system for installing a Winsock Service Provider into a data processing system having the Winsock Direct architecture, the data processing system executing on one or more hardware processors, supporting a Microsoft® Windows® operating system and at least one application and having access to a memory and a network interface device capable of supporting a communication link over a network with another network interface device, the system comprising:
    a user-level Winsock Service Provider operable to form data into packets for transmission within the context of an application in accordance with a protocol by which the data is to be transmitted, said protocol being one of TCP/IP and UDP/IP, to write the packets to be transmitted to an area of the memory and to initiate by means of communication between itself and the network interface device a transmission operation of at least some of the packets over the network; and
    an installer configured to install the transport library into the data processing system;
    wherein
        the operating system is one in which an installed transport library communicates with an application by means of a user-mode Winsock socket library, the primary transport library for said protocol is the Winsock Service Provider, and a transport library further down a hierarchy of transport libraries for said protocol is a transport library of the operating system; and
        said area of the memory is a buffer allocated by the operating m
    wherein said buffer is:
        accessible to the Winsock Service Provider by a memory mapping onto the buffer provided by the operating system,
        accessible to the network interface device by reference to a virtual address associated with said buffer by the operating system and programmed into the network interface device by the operating system and
        not addressable by entities on the network external to the data processing system.

18. A system for transmitting or receiving data, the system comprising:
    a data processing system having the Winsock Direct architecture supporting a Microsoft® Windows® operating system and at least one application and having access to a memory, one or more areas of which are allocated for use as buffers in the transfer of data between the data processing system and the network interface device;
    a network interface device capable of supporting a communication link over a network with another network interface device;
    the system being operable to:
    transmit data according to the method as claimed in claim 1; and
    receive data according to a method that comprises the steps of:
        establishing by means of a transport library of the data processing system a channel for reception of data by the application, said application executed by one or more hardware processors,
        said transport library being selected by a user-mode Winsock socket library of the data processing system in accordance with an indication of a protocol by which the data is received, said protocol being one of TCP/IP and UDP/IP, wherein the primary transport library for said protocol is the user-level Winsock Service Provider, and a transport library further down a hierarchy of transport libraries for said protocol is a transport library of the operating system; and
        the channel being associated with a second buffer allocated by the operating system,
        wherein said second buffer is:
            accessible to the Winsock Service Provider by a memory mapping onto the second buffer provided by the operating system,
            accessible to the network interface device by reference to a virtual address associated with said second buffer by the operating system and programmed into the network interface device by the operating system and
            not addressable by entities on the network external to the data processing system;
        writing data packets received at the network interface device to said second buffer;
        the Winsock Service Provider reading the received data packets from the second buffer and processing the data packets within the context of the application in accordance with said protocol by which the data packets are received so as to extract the data therein; and
        the application receiving the extracted data from the Winsock Service Provider by means of the Winsock socket library.

19. A protocol processing entity for performing network-level protocol processing in a data processing system having the Winsock Direct architecture, the data processing system executing on one or more hardware processors, and supporting the Microsoft® Windows® operating system and at least one application and having access to a network interface device capable of supporting a communication link over a network with another network interface device, the protocol processing entity being embodied as a user-level Winsock Service Provider and being configured to:
    establish a channel for reception of data by an application, the channel being associated with a buffer allocated by the operating system,
    wherein said buffer is:
        accessible to the Winsock Service Provider by a memory mapping onto the buffer provided by the operating system,
        accessible to the network interface device by reference to a virtual address associated with said buffer by the operating system and programmed into the network interface device by the operating system and
        not addressable by entities on the network external to the data processing system;

read the received data packets from the buffer and process the data packets within the context of the application in accordance with a protocol by which the data packets are received so as to extract the data therein, said protocol being one of TCP/IP and UDP/IP, the primary transport library for said protocol being the Winsock Service Provider, and a transport library further down a hierarchy of transport libraries for said protocol being a transport library of the operating system; and sending the extracted data to the application by means of a user-mode Winsock socket library of the data processing system.

* * * * *